United States Patent
Somech et al.

(10) Patent No.: US 11,699,039 B2
(45) Date of Patent: Jul. 11, 2023

(54) VIRTUAL ASSISTANT PROVIDING ENHANCED COMMUNICATION SESSION SERVICES

(71) Applicant: MICROSOFT TECHNOLOGY LICENSING, LLC, Redmond, WA (US)

(72) Inventors: Haim Somech, Herzliya (IL); Shira Weinberg, Herzliya (IL); Adi Miller, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 15/636,346

(22) Filed: Jun. 28, 2017

(65) Prior Publication Data

US 2019/0005024 A1    Jan. 3, 2019

(51) Int. Cl.
*G06F 40/00* (2020.01)
*G06F 40/103* (2020.01)
(Continued)

(52) U.S. Cl.
CPC ............ *G06F 40/30* (2020.01); *G06F 16/243* (2019.01); *G06F 16/248* (2019.01);
(Continued)

(58) Field of Classification Search
CPC .. G06F 17/27; G06F 17/2705; G06F 17/2785; G06F 40/00; H04L 51/04
See application file for complete search history.

(56) References Cited

U.S. PATENT DOCUMENTS 6,907,571 B2    6/2005    Slotznick
7,886,012 B2    2/2011    Bedi et al.
(Continued)

FOREIGN PATENT DOCUMENTS

WO    2007134402 A1    11/2007

OTHER PUBLICATIONS

Paulus, "Your TLDR by an ai: a Deep Reinforced Model for Abstractive Summarization", May 11, 2017, pp. 1-13.*
(Continued)

*Primary Examiner* — Olujimi A Adesanya
(74) *Attorney, Agent, or Firm* — Shook, Hardy & Bacon L.L.P.

(57) ABSTRACT

Methods for providing enhanced services to users participating in communication sessions (CS), via a virtual assistant, are disclosed. One method receives content that is exchanged by users participating in the CS. The content includes natural language expressions that encode a conversation carried out by users. The method determines content features based on natural language models. The content features indicate intended semantics of the natural language expressions. The method determines a relevance of the content and identifies portions of the content that are likely relevant to the user. Determining the relevance is based on the content features, a context of the CS, a user-interest model, and a content-relevance model of the natural language models. Identifying the likely relevant content is based on the determined relevance of the content and a relevance threshold. A summary of the CS is automatically generated from summarized versions of the likely relevant portions of the content.

17 Claims, 6 Drawing Sheets

(51) Int. Cl.

| | | |
|---|---|---|
| *G06F 40/30* | (2020.01) | |
| *H04L 67/14* | (2022.01) | |
| *H04L 51/043* | (2022.01) | |
| *H04L 67/306* | (2022.01) | |
| *G06Q 10/10* | (2023.01) | |
| *H04L 51/02* | (2022.01) | |
| *H04L 51/56* | (2022.01) | |
| *H04L 67/50* | (2022.01) | |
| *G06F 16/242* | (2019.01) | |
| *G06F 16/2455* | (2019.01) | |
| *G06F 16/2457* | (2019.01) | |
| *G06F 16/9535* | (2019.01) | |
| *G06F 16/248* | (2019.01) | |

(52) U.S. Cl.
CPC .... *G06F 16/2455* (2019.01); *G06F 16/24575* (2019.01); *G06F 16/9535* (2019.01); *G06Q 10/10* (2013.01); *H04L 51/02* (2013.01); *H04L 51/043* (2013.01); *H04L 51/56* (2022.05); *H04L 67/14* (2013.01); *H04L 67/306* (2013.01); *H04L 67/535* (2022.05)

(56) References Cited

U.S. PATENT DOCUMENTS

| | | | | |
|---|---|---|---|---|
| 8,095,613 | B1* | 1/2012 | Perkowitz | G06Q 10/109 709/207 |
| 8,316,315 | B2* | 11/2012 | Portnoy | G06Q 10/107 715/764 |
| 8,626,832 | B2 | 1/2014 | Jerrard-Dunne et al. | |
| 8,719,200 | B2 | 5/2014 | Beilby et al. | |
| 9,009,256 | B1* | 4/2015 | DeMorrow | G06F 16/35 709/217 |
| 9,043,197 | B1* | 5/2015 | Pasca | G06F 17/30654 704/9 |
| 9,116,984 | B2 | 8/2015 | Caldwell et al. | |
| 9,177,318 | B2 | 11/2015 | Shen et al. | |
| 9,318,108 | B2 | 4/2016 | Gruber et al. | |
| 9,369,410 | B2 | 6/2016 | Capper et al. | |
| 9,374,327 | B2 | 6/2016 | Rao DV | |
| 9,405,432 | B2 | 8/2016 | Vats et al. | |
| 9,430,738 | B1* | 8/2016 | Hui | G06N 5/022 |
| 9,559,993 | B2 | 1/2017 | Palakovich et al. | |
| 10,931,611 | B2* | 2/2021 | Dotan-Cohen | H04L 51/224 |
| 2004/0143636 | A1* | 7/2004 | Horvitz | G05B 19/404 709/207 |
| 2004/0236719 | A1* | 11/2004 | Horvitz | H04L 51/12 |
| 2006/0080161 | A1* | 4/2006 | Arnett | G06F 21/31 705/7.31 |
| 2006/0111894 | A1* | 5/2006 | Sammarco | G06Q 10/06 704/9 |
| 2008/0275849 | A1* | 11/2008 | Basu | G06Q 30/02 |
| 2008/0300872 | A1 | 12/2008 | Basu et al. | |
| 2008/0311935 | A1* | 12/2008 | Tysowski | H04L 51/04 455/466 |
| 2009/0055481 | A1* | 2/2009 | Carmel | G06Q 10/107 709/206 |
| 2009/0216848 | A1 | 8/2009 | Slotznick | |
| 2010/0180001 | A1* | 7/2010 | Hardt | H04L 12/189 709/207 |
| 2010/0318620 | A1* | 12/2010 | Bansal | H04L 51/216 709/206 |
| 2010/0332218 | A1* | 12/2010 | Liu | H04M 1/72552 704/9 |
| 2011/0060591 | A1* | 3/2011 | Chanvez | H04M 3/2281 704/270 |
| 2011/0078105 | A1 | 3/2011 | Wallace et al. | |
| 2012/0173624 | A1 | 7/2012 | Beerse et al. | |
| 2013/0006973 | A1 | 1/2013 | Caldwell et al. | |
| 2013/0124189 | A1 | 5/2013 | Baldwin et al. | |
| 2013/0124191 | A1* | 5/2013 | Louis | G06F 17/30 704/9 |
| 2013/0144616 | A1 | 6/2013 | Bangalore et al. | |
| 2013/0218896 | A1 | 8/2013 | Palay | |
| 2013/0218987 | A1 | 8/2013 | Chudge et al. | |
| 2013/0246524 | A1* | 9/2013 | Berner | G06Q 50/01 709/204 |
| 2013/0253910 | A1* | 9/2013 | Turner | G06F 17/274 704/9 |
| 2014/0143405 | A1* | 5/2014 | Pavlidis | G06Q 30/0202 709/224 |
| 2014/0164476 | A1 | 6/2014 | Thomson | |
| 2014/0189022 | A1* | 7/2014 | Strumwasser | G06Q 10/10 709/224 |
| 2014/0337370 | A1 | 11/2014 | Aravamudan et al. | |
| 2015/0120680 | A1 | 4/2015 | Alonso et al. | |
| 2015/0178388 | A1 | 6/2015 | Winnemoeller et al. | |
| 2015/0186156 | A1 | 7/2015 | Brown et al. | |
| 2015/0244687 | A1* | 8/2015 | Perez | G16H 10/60 726/4 |
| 2016/0142359 | A1* | 5/2016 | Lock | H04L 51/24 709/206 |
| 2016/0170971 | A1* | 6/2016 | McSherry | G06F 40/274 704/9 |
| 2016/0173428 | A1* | 6/2016 | Balasubramanian | G06F 16/335 709/206 |
| 2016/0342285 | A1* | 11/2016 | Wang | G06F 3/0481 |
| 2016/0344673 | A1* | 11/2016 | Abou Mahmoud | H04L 51/32 |
| 2016/0350101 | A1 | 12/2016 | Gelfenbeyn et al. | |
| 2017/0006069 | A1 | 1/2017 | Srivastava et al. | |
| 2017/0092264 | A1 | 3/2017 | Hakkani-tur et al. | |
| 2017/0126594 | A1 | 5/2017 | Chudge et al. | |
| 2017/0140041 | A1 | 5/2017 | Dotan-cohen et al. | |
| 2017/0142036 | A1* | 5/2017 | Li | G06F 17/2765 |
| 2017/0142046 | A1* | 5/2017 | Abou Mahmoud | G06F 40/40 |
| 2017/0147554 | A1 | 5/2017 | Chen et al. | |
| 2017/0180276 | A1* | 6/2017 | Gershony | H04L 51/02 |
| 2017/0180294 | A1 | 6/2017 | Milligan et al. | |
| 2017/0287475 | A1 | 10/2017 | Baldwin | |
| 2017/0293834 | A1* | 10/2017 | Raison | H04L 51/02 |
| 2017/0345416 | A1 | 11/2017 | Bangalore | |
| 2017/0359393 | A1 | 12/2017 | Rajagopal et al. | |
| 2018/0067991 | A1 | 3/2018 | Agarwal et al. | |
| 2018/0095947 | A1 | 4/2018 | Castelli et al. | |
| 2018/0108347 | A1* | 4/2018 | Ogata | G06F 16/335 |
| 2018/0145934 | A1 | 5/2018 | Pappu et al. | |
| 2018/0218734 | A1* | 8/2018 | Somech | G10L 15/16 |
| 2018/0293558 | A1 | 10/2018 | Hosp | |
| 2018/0300400 | A1* | 10/2018 | Paulus | G06N 3/044 |
| 2018/0322380 | A1 | 11/2018 | Aggarwal | |
| 2019/0005021 | A1* | 1/2019 | Miller | G06F 17/279 |
| 2019/0005023 | A1* | 1/2019 | Olsen | G06F 17/2785 |
| 2020/0394366 | A1 | 12/2020 | Miller et al. | |

OTHER PUBLICATIONS

"Deep Learning for Chatbots, Part 1—Introduction", Published on: Apr. 6, 2016 Available at: http://www.wildml.com/2016/04/deep-learning-for-chatbots-part-1-introduction/.

Kerly, et al., "The potential for chatbots in negotiated learner modelling: a wizard-of-oz study", In Proceedings of the 8th international conference on Intelligent Tutoring Systems, Jun. 26, 2006, 10 pages.

Lunden, Ingrid, "Zendesk's "Automatic Answers" taps machine learning, AI to generate bot-style email responses", Published on: Jul. 13, 2016 Available at: https://techcrunch.com/2016/07/13/zendesks-automatic-answers-taps-machine-learning-ai-to-generate-bot-style-email-responses/.

"International Search Report and Written Opinion Issued in PCT Application No. PCT/US2018/034263", dated Aug. 20, 2018, 13 Pages.

"Office Action Issued in Indian Patent Application No. 201947053914", dated Feb. 26, 2022, 6 Pages.

"Office Action Issued in European Patent Application No. 18734662.2", dated May 16, 2022, 6 Pages.

"Office Action Issued in European Patent Application No. 18734662.2", dated Mar. 11, 2021, 7 Pages.

(56) References Cited

OTHER PUBLICATIONS

"Final Office Action Issued in U.S. Appl. No. 15/637,831", dated Jan. 2, 2019, 35 Pages.
"Non-Final Office Action Issued in U.S. Appl. No. 15/637,831", dated Jun. 29, 2018, 27 Pages.
"Non-Final Office Action Issued in U.S. Appl. No. 15/637,831", dated Apr. 17, 2019, 37 Pages.
"Notice of Allowance Issued in U.S. Appl. No. 15/637,831", dated Oct. 31, 2019, 10 Pages.
"Notice of Allowance Issued in U.S. Appl. No. 15/637,831", dated Dec. 5, 2019, 6 Pages.
"Final Office Action Issued in U.S. Appl. No. 16/811,868", dated Sep. 12, 2022, 35 Pages.
"Non Final Office Action Issued in U.S. Appl. No. 16/811,868", dated Dec. 2, 2022, 26 Pages.
"Non Final Office Action Issued in U.S. Appl. No. 16/811,868", dated Dec. 6, 2021, 32 Pages.
"Office Action Issued in Indian Patent Application No. 202047003490", dated Mar. 2, 2022, 7 Pages.
"International Search Report and Written Opinion Issued in PCT Application No. PCT/US18/039639", dated Sep. 10, 2018, 11 Pages.

* cited by examiner

VIRTUAL ASSISTANT PROVIDING ENHANCED COMMUNICATION SESSION SERVICES

BACKGROUND

Due to the ever-increasing ubiquity of networked computing devices, users may now simultaneously participate in multiple communication sessions, such as chat sessions, instant messaging (IM), or other video, audio, and/or text-based real-time communications. The simultaneous communication sessions may involve separate sets of groups of participants. Likewise, the content of the multiple communication sessions may be directed at disparate topics, while the context of each communication session may be unique. That is, users are now enabled to simultaneously participate in topically disparate real-time conversations of distinct context that involve separate groups of people.

Even though computing devices have enabled users to simultaneously participate in multiple conversations, users may experience difficulty in the real-time engagement of such multiple conversations. That is, human users may be limited in their ability to simultaneously monitor, track, and actively participate in multiple real-time communication sessions. More succinctly, human users may experience difficulty in maintaining an active engagement in more than one conversation. When actively engaged in one conversation, the user may be at least somewhat disengaged in the other conversations.

For instance, when responding to the other users in a particular conversation, the user may fail to process and/or acknowledge critical information provided in the other conversations. Thus, the user may be required to manually review the communication session logs for the other conversations. Additionally, the user may risk the loss of opportunity to respond at critical junctures in the other conversations. Furthermore, users may experience difficulty in presenting and/or tracking complex arguments or analyses of disparate topics that are simultaneously distributed across the multiple conversations. Accordingly, a user attempting to simultaneously participate in multiple communication sessions may miss information, appear to other users as unresponsive and/or disengaged, and lose opportunities to provide their unique perspective to each of the conversations. That is, the utility and user-experience of a real-time communication session may be degraded when the user is attempting to simultaneously participate in multiple communication sessions.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards providing enhanced services to a user participating in one or more communication sessions (CSs). At least a portion of such CS services may be provided via an enhanced virtual assistant (VA) or an enhanced "chatbot." The enhanced services may include analyzing a CS, identifying likely relevant content of the CS, and providing a summary of the CS based on the identified likely relevant content. The various enhanced services may be enabled by one or more methods. One such method may be implemented by receiving content that is exchanged in the CS. The content includes natural language expressions or utterances that encode a conversation carried out by a plurality of users participating in the CS. The method may be implemented by determining content features of the content based on the content and natural language models. The content features indicate intended semantics of the natural language expressions. The method may further be implemented by determining a relevance of the content and identifying portions of the content that are likely relevant to the user. Determining the relevance of the content may be based on the content features, a user-interest model for the user, and a content-relevance model for the user. Identifying the likely relevant content is based on the relevance of the content and various relevance thresholds. A summary of the CS may be generated based on at least the likely relevant portions of the content. The summary of the CS may be automatically generated and provided to the user.

In various embodiments, the method may further include monitoring user activity of the user and identifying and/or inferring user-activity patterns based on the monitored user activity. The user-interest and/or the content-relevance models may be generated, updated, and/or trained based on the inferred user-activity patterns. The method may further include receiving additional data associated with the CS, such as but not limited to metadata associated with the CS. Contextual features of the CS may be determined based on the received additional data and a CS context model. The contextual features may indicate a context of the conversations, or at least of the CS, for the user. The relevance of the content may be determined further based on the contextual features of the CS. In addition to the user-interest and content-relevance models, the relevance of the content may be determined based other data relating to the user, such as the user-activity information, history interacting with various applications, web-surfing history, user preferences, and the like. In various embodiments, the information from the user's user profile may be employed to determine the relevance of the content.

The method may be further implemented by identifying a sub-portion of the likely relevant portions of the content that are highly relevant to the user. Identifying the highly relevant portions of the content may be based on the relevance of the content and an additional relevance threshold. The additional relevance threshold may be greater than the relevance thresholds employed to identify the likely relevant portions of the content. For instance, the additional threshold may be a highly relevant threshold or an urgency threshold. A real-time, or near real-time, notification of the highly relevant content may be provided to the first user.

In at least one embodiment, the method is implemented by determining content-substance features and content-style features. The content-substance features and the content-style features are based on content-substance and content-style models included in the natural language models. The content-substance features indicate at least topics discussed in the conversation. The content-style features may include features other than substantive features of the content. For instance, content-style features may indicate an emotion, intonation, volume, cadence, pitch, or other style-related features, or a variance or change in one or more of the style-related features of one or more of the users participating in the CS. The determined relevance of the content may be further based on the content-substance features and the content-style features.

The method may further be implemented by generating summarized versions of at least some of the likely relevant portions of the content. The summarized versions may be generated using one or more natural language models. The summary of the CS may be generated such that the summary includes the summarized versions of the likely relevant content portions. The method may provide the summary to the user.

In various embodiments, the user may provide feedback to the system regarding the accuracy and/or utility of the provided summary. This feedback may be employed by the various embodiments to further train and/or update the various models, such as the content-relevance model and/or the user-interest model. For instance, in an embodiment, the user may be provided a user interface (UI) that enables or facilitates the user to provide feedback on the summary. Such a UI may include one or more buttons, sliders, levers, scales, or the like that enable the user to rate and/or annotate the summary. For example, the user may rate the summary in terms as "4 out of 5" stars, or some other scale. The rating scale may be a binary scale, such as a "thumbs-up" or "thumbs-down" scale. The user may annotate and/or correct the summary. In one embodiment, a prompt may be provided to the user for each section of the summary, wherein the user can indicate a utility of each section. The prompt may individually highlight each section of the summary, as the user is reviewing and rating the section. The various models may then be refined and/or updated based on training that employs such feedback. In some embodiments, another user may provide the user feedback. In some embodiments, a "consensus," "averaging,", a "blending," or a "combination" of user feedback from multiple users may be used to update the various data models.

In other embodiments, user feedback may be provided via other mechanisms. For instance, the method may include receiving another summary of the CS. The other summary may be a manually curated version of the automatically generated summary. In another embodiment, the other summary may be manually generated by the user. The other summary may be employed as user feedback for training purposes. A comparison of the summary and the other summary may be generated. The content-relevance model may be updated based on the comparison of the summary of the CS and the other summary of the CS. That is, the other summary of the CS may be employed as a "ground-truth" or "baseline" summary for the training of the content-relevance model. In this way, embodiments of the disclosure provide an enhanced utility and user experience of participating in one or more CSs.

BRIEF DESCRIPTION OF THE DRAWINGS

Aspects of the disclosure are described in detail below with reference to the attached drawing figures, wherein.

DETAILED DESCRIPTION

Figure 1:
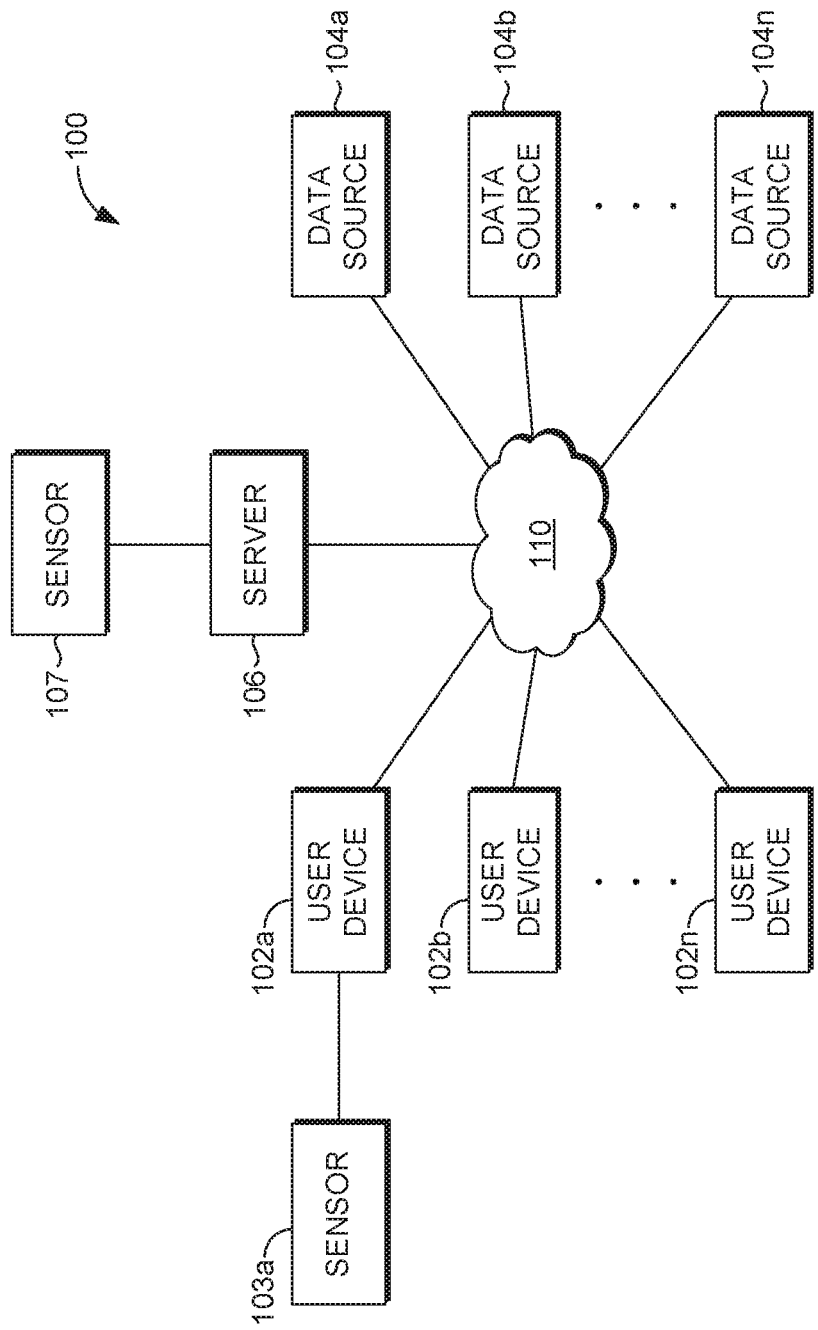
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to providing various enhanced services to a user participating in one or more communication sessions (CSs). As discussed throughout, the provided services may enhance the utility and user experience for the user participating in the one or more CSs. In particular, embodiments herein actively monitor and analyze the content and context of the one or more CSs, via various natural language processing (NLP) and other machine-learning (ML) methodologies. Various data models, such as but not limited to ML data models, are employed to monitor and analyze, in real time or near real time, data associated with the CS, including the content and metadata of the CS. That is, data models are employed to determine a context of the CS, as well as a relevance of various portions of the content based on the determined context. Portions of the content that are likely to be relevant to the user, based on the user's activities and interests, are identified. The embodiments generate and provide the user with a summary of the conversation carried out via the CS based on the context of the CS and the relevance of the content. The CS summary may provide a hierarchical enumeration and/or summarized version of at least a subset of the content that is identified as likely relevant to the user.

As discussed throughout, various ML methodologies may be employed to analyze the content and context of the CS, as well as determining the relevance of the content and generating the summaries of the likely relevant content. More particularly, ML methodologies are employed to generate and/or train various ML data models to determine each of the substance and style of the content, as well as the relevancy to one or more particular users. Additional ML data models are generated and/or trained to identify relevant content for the user and generate the summary for the user. That is, a data model may be customized to a particular user.

The relevance and the summary of the content may be targeted to the specific user. That is, data models, such as but not limited to a user-interest data model, may be generated for the specific user. The user-interest models may be trained based on at least monitored user activity and inferred user-activity patterns, as well as user profile information for the specific user. The user-interest model, as well as the context of the CS, may be employed to determine the relevancy of the content, specific to the user and the context of the CS, and generate a summary of the CS. In at least one embodiment, the various embodiments provide real-time notifications to the user when content that is likely to be highly relevant to the user is identified. That is, when content that is highly relevant and/or urgent is identified, embodiments may provide real-time audible and/or visual indications of the highly relevant content.

Analyzing the content of a CS may include employing various ML methodologies, such as trained NLP models to determine and/or identify various content features of the content, such as but not limited to content-substance and content-style features. The content-substance features indicate the semantics or meanings of the natural language utterances and/or expressions embedded in the conversations carried out via the CS. That is, the content-substance features may indicate topics being conversed about, as well as the intentioned semantic meaning and context of the speaker's expressions. In contrast, the content-style features indicate various stylistic characteristics of the natural language utterances and/or expressions embedded in the conversations. That is, the content-style features indicate the speaking styles of the speakers.

Analyzing the context of the CS may include determining various contextual features via ML methodologies, statistical analyses, and other data analysis techniques. The context features indicate the context of the conversation carried out via the CS. The determined and/or identified relevance of the content may be based on the determined content features and context features, as well as monitored user activity, inferred user-activity patterns, and/or generated user-interest models. The CS summary may be generated via various ML methodologies that receive, as input, the analyzed content and context, e.g., the content and context features, as well as the relevance of the content. One or more ML methodologies may be employed in the generation of summarized versions of the likely relevant content, targeted to the specific interests of the user and the context of the CS. In at least some embodiments, the summarized versions of the likely-relevant content are based on one or more analyses performed by human agents. The CS summary may be at least partially generated by a human agent.

Thus, various embodiments are directed towards an enhanced virtual assistant (VA) that provides enhanced CS services. Such enhanced CS services include, but are not limited to, providing one or more summaries of conversations carried out via one or more CSs. The term "summary" is not intended to be limited and may include, by way of example, summarized versions of the subset of the content that is identified as likely relevant to a particular user, wherein the determination and/or identification of the likely relevant content is targeted to the user. Furthermore, the style of the CS summary, including the formatting of the summary and/or the syntactic/grammar style of the CS summary, may be targeted to the user as well. In at least one embodiment, a separate summary of the CS is provided to each user participating in the CS, wherein each of the separate summaries are targeted to each of the specific users.

More particularly, the determination of the relevance of the content may be targeted to the user based on the user's interests, the user's historical and/or current user activities, the context of the CS, and/or relationships between the user and the other users participating in the CS, as well as various other factors discussed herein. In various embodiments, the user's activity is monitored and user-activity patterns are inferred and/or learned. User-activity information, such as the inferred user-activity patterns, are employed to generate various user-interest data models. That is, the embodiments employ various ML methodologies to learn topics of interests of the user. The user may assist in the generating and/or updating of user-interest models via providing user profile information and/or the manual curation of the generated user-interest models. The embodiments learn to identify relevant content via the generation of user-interest models and other data models, based on various ML methodologies.

The CS summary may be targeted to the user based on the user-targeted relevance of the content and the context of the CS, as well as the user's preferences for stylistic and substantive features of CS summaries. That is, the various embodiments may learn additional data models that indicate the user's preferred substantive and stylistic (e.g., formatting) features of a CS summary. The user may assist in the generation and updating of the various data models that enable analyzing CSs, identifying relevant content of the CSs, and generating useful summaries of the likely relevant content of the CSs, via the manual curation of the automatically generated summaries and/or providing manually generated versions of a CS summary for one or more CSs. That is, the embodiments may update the various ML data models based on the user editing the generated summary and/or providing a manually generated summary to provide a "ground-truth," "target," or "baseline" summary for an automatically monitored, analyzed, and summarized CS. The automatically generated CS summary may be provided to the user in a textual format and/or via audible speech that is automatically generated via text-to-voice services enabled by the VA. For instances where a user is engaged in multiple CSs, and where summaries may be generated for more than one CS, a single summary may be provided that addresses the multiple CSs, or separate summaries may be provided for each CS. For example, a summary may be provided via the chat window that is hosting the CS, for example, within the Skype chat widow for a Skype meeting. In particular, in one example, upon returning to a CS in which the user was not actively participating, a VA or other service might provide a summary as a report provided to the user within the chat window, such as "Welcome back, Shira, here are the highlights of what you missed . . . "

In some embodiments, the summary may be emailed to the user or communicated to the user via a different user device. In some embodiments, a summary may be provided to the user in advance of a future meeting with the similar participants or similar topic, as a recap of a previous meeting. Further, the summaries may be stored and/or indexed for use in record keeping and/or querying.

For content that is identified as highly relevant to the user, the various embodiments may provide, real-time and/or near real-time, audible and/or visual notifications or prompts to call the user's attention to the content. For instance, as discussed herein, the determined relevance may include a determined temporal urgency of the content. When a user is simultaneously participating in multiple CSs distributed across multiple windows or user interfaces, the various embodiments may highlight or position the user interface that includes identified highly urgent content in the foreground of the user's display device. The user's attention may further be directed to the highly urgent content with additional selective-highlighting within the user interface that is now in the display device's foreground. For example, where a user's input is solicited during the CS or where a decision is being made by members of the CS and the user's input is needed or the user would typically desire to weigh in. Thus, in addition to summarizing relevant CS content, the enhanced CS services provided by the various embodiments include identifying and highlighting CS content that is highly relevant to the user, where the identification of highly relevant content is targeted to the specific user. In at least one embodiment, the notification to highlight highly relevant content may be provided via automatically generated speech. The speech-based notification may include the highly relevant content, a summarized version of the highly relevant content, or simply a spoken, or otherwise audible, indication to direct the user's attention to a specific user interface.

At least a portion of the enhanced CS services enabled by the various embodiments may be provided via an enhanced "VA" or at least an enhanced "chat-bot" (or simply an enhanced "bot"). Although conventional VAs and conventional chat-bots have been previously available, such conventional VAs and chat-bots are not enabled to automatically generate a summary of a multi-person conversation carried out via a CS, as the various embodiments herein are enabled to generate. Rather, conventional VAs and chat-bots may automatically generate responses to questions posed by users of a CS. That is, conventional VAs and chat-bots are attempts at enabling an agent to pass a rudimentary form of a "Turing Test." In contrast, the various embodiments herein employ technical implementations of various ML methodologies, such as NLP, to identify relevant content generated by users and generate summarized versions of the portions of the content that are identified as likely relevant to the user.

In further contrast to conventional VAs and chat-bots, the embodiments herein implement ML methodologies, such as but not limited to topic modeling and keyword analysis, to identify relevant content that is targeted to the user-interests, user-activity patterns, and CS summary preferences of the particular user. Furthermore, the relevancy of the content may be based on the context of the CS. Conventional VAs and chat-bots typically provide the same response to the same question, independent of the user that posed the question and the context that the question was asked within. That is, the content generated by a conventional VA or chat-bot is general and not dependent upon the user that the content is provided to and/or the context of the CS, such as, without limitation, the other members of the CS, other information about the CS, where the user is presently located, what type of user device the user is using to access the CS, other ongoing CSs in which the user is participating, the user's schedule, and/or other activities that the user may be engaged in during the CS. However, by employing user-specific data to generate and update data models, the various embodiments herein target the identification and summarization of content that is likely relevant to the user and to the context of the CS. The relevance of the content is based on the user's specific interests, activities, and the context of the CS.

For instance, an embodiment may provide a summary to each of ten users participating in a CS, wherein each of the ten summaries is targeted to one specific user of the ten users. Each of the users may have separate interests. Furthermore, the context of the CS for each user may be different. For example, in a particular CS, one user may be a leader with a first context and another user may be an observer with a second context. The summary for each user is based on each of the users' interests and the users' context. That is, each of the ten summaries is a different and/or unique summary based on the learned ML data models for the associated user.

As used herein, the terms "communication session" and "CS" may be used interchangeably to broadly refer to any session where two or more computing devices are employed to exchange information and/or data between two or more users. The information and/or data exchanged in a CS may herein be referred to as "CS content," or simply "content." For instance, a CS may include the exchange of one or more electronic mail messages (i.e., email) between two or more users, where the emails include textual and/or non-textual content. In some embodiments, a CS may be a real-time CS, such as but not limited to a "chat" or "instant messaging" (IM) session. A CS may include the exchange of textual, audible, and/or visual content. Visual content may include image, graphical, and/or video content. Thus, content may include multimedia content. Thus, two or more users may carry out a "conversation" via the exchange of content enabled by a CS.

Some CSs may include the real-time exchange of textual content (e.g., an IM or textual chat session), while other CSs involve the real-time exchange of video and/or audio content (e.g., a video chat session). In at least one embodiment, a CS may include the real-time exchange of audio-only content. For example, a CS may be enabled via a Voice Over Internet Protocol (VOIP). A CS may be a telephone and/or video call. For embodiments that involve a spoken conversation, i.e., the natural language utterances and/or expressions are audible, speech-to-text services may be employed to generate textual content for the analyses of the content and the context.

Although various real-time examples of CSs (i.e., those CSs that enable a real-time conversation) are herein enumerated, it should be understood that a CS may not be required to be a real-time CS. A user may, but need not, simultaneously participate in more than one CS. Thus, the various embodiments may, in real time or near real time, simultaneously monitor, analyze, and summarize multiple CSs that a user is currently participating in.

More particularly, a user may simultaneously participate in multiple CSs, wherein the enhanced CS services described herein are provided to the user for each of the multiple CSs. That is, the user being provided enhanced CS services may participate in one or more real-time "conversations" via one or more CSs. A separate or distinct group or set of users may be participating in and/or associated with each of the one or more CSs. For instance, user_A may simultaneously be participating in CS_X, CS_Y, and CS_Z, wherein user_A, user_B, and user_C are participating in (or associated with) CS_X; user_A, user_D, and user_E are participating in CS_Y; and user_A, user_B, and user_F are participating in CS_Z. Thus, a user may simultaneously participate in multiple conversations, via exchanging content within multiple CSs with separate associated groups of users.

The exchanged content may, but is not required to, include natural language content. That is, content may include ordered sequences of natural language utterances and/or expressions. Each utterance and/or expression may include an ordered sequence of natural language tokens (e.g., words). A unit of content may herein be interchangeably referred to as a "line of content" or simply a "content line." Thus, a CS includes an ordered sequence of content lines. Each content line may include an ordered sequence of spoken or textual natural language tokens, phrases, sentences, sentence fragments, paragraphs, alpha-numeric characters, punctuation characters, and such. A content line may be equivalent to a line of textual or spoken content in a chat session. However, it should be noted that a content line may include a fragment of a (textual or spoken) chat session line and/or an ordered sequence of multiple chat session lines. A content line may include one or more declarative statements, expository statements, questions, responses to questions, or virtually any natural language expression or utterance. Thus, a conversation carried out via a CS is comprised of the ordered sequence of content lines, i.e., the content of the CS.

CS content may include symbols, such as but not limited to mathematical, algebraic, geometric, engineering, and/or logic symbols. For instance, content may include any mathematical or logical symbols, notations, or operators, such as differential, products, or summation operators. Another example of mathematical notation included in content is tensor, matrix, and vector notations. Content may include engineering schematic symbols, such as schematic representations for resistors, diodes, and transistors.

Other symbolic content may include emojis, emoticons, avatars, (animated and/or static) GIFs, or image data, and such. For example, users frequently include emojis and/or animated GIFs in content to convey concepts. Thus, "a natural language expression" may include any such symbolic content such as mathematical notation, emojis, emoticons, and GIFs. The various natural language processing (NLP) and natural language models, such as but not limited to content-substance, content-style, and response-generation models are enabled to analyze and generate content that includes such symbolic content.

In at least one embodiment, such symbolic content may be automatically transformed into textual content via an identification of various concepts associated with the symbolic content. For example, content that includes the popular "eggplant" emoji may be analyzed to include the token or word "eggplant" wherever the emoji is included in the content. In some embodiments, metadata and/or other identifying data associated with the symbolic content may be employed in such natural language models. Image recognition, image feature extraction, or computer vision methods may be employed to analyze and/or generate such symbolic content. Thus, the natural language models may include deep learning auto encoders and/or decoders to analyze and/or generate natural language expressions including symbolic expressions.

Thus, in the various embodiments, a response may automatically be generated, wherein the response includes one or more emojis, emoticons, animated GIFS, mathematical notation, and other symbolic content. Various responses may be generated to represent likely stylistic choices of the user, such as emotions, sentiments, and the like. That is, a stylistic response may be automatically generated to include likely stylistic choices of the user, such as encoding emotions and sentiments in the response. For example, a stylistic response may be generated to represent the user's approval or happiness via the inclusion of a "happy face" emoji in the response. The content-style and response-generation models may be trained to emulate and/or simulate the user's stylistic choices of employing emojis, emoticons, and other symbolic content.

When analyzed, one or more content features may be determined for each line of content. Content features for a content line (or another portion of content) may include an indication or encoding of the "speaker" of the content line. As used herein, the content's speaker refers to the user that generated the content and/or provided the content to the CS to be exchanged. The speaker may or may not have audibly spoken the content. For instance, a speaker may manually enter or type the content. A content feature may also include an indication of the user or group of users that the content line is directed at. For instance, if the content line includes a question directed at a particular user or group of users, a content feature for the content line may include the particular user or group of users. A content feature may also include one or more indications of whether the content line includes one or more declarative statements, expository statements, questions, responses to questions, and such.

Determined content features for a content line (or another portion of content such as a contiguous block of content lines) may include both content-substance features and content-style features. The content-substance features of a content line may encode or indicate the conceptual or semantic components of the content line. That is, the content-substance feature may indicate the semantics, meanings, and/or intentions associated with the content line. A content-substance feature may indicate one or more topics and/or keywords associated with the content line. A content-substance feature may also indicate a sentiment of the speaker. That is, a sentiment content-substance feature may encode an identified and/or categorized opinion expressed in the content.

In contrast, the content-style features of a content line may encode or represent the stylistic (e.g., grammatical) choices of the speaker of the content line. That is, content-style features may indicate grammar, vocabulary, and dialogue choices of the speaker. For instance, content-style features may encode the speaking style of the speaker. Content-style features may additionally encode one or more emotions of the speaker, e.g., anger, surprise, satisfaction, happiness, and other emotions. Content-style features may indicate the intonation, pitch, speed, and volume of the speaker, as well as changes in these features, such as speeding up, slowing down, or changing volume.

Determined contextual features for a CS may include, but are not otherwise limited to, an indication or encoding of each of the users participating in and/or associated with the CS, an activity and/or engagement level of each of the associated users, and an availability of each of the associated users. Contextual features may additionally indicate initiating and terminating time stamps of the CS, the temporal duration of the CS, and an indication of other past or current CSs that the associated users have or are currently participating in. Additional contextual features may indicate an approximate geo-location and/or logical location of each associated user. A CS contextual feature may include or be based on any user profile information for each of the associated users.

A contextual feature for a CS may indicate or encode a hierarchical relational graph that indicates one or more relationships between at least some of the pairs of associated users of the CS. An indicated relationship may include a professional, personal, or genetic relationship. For instance, the relational graph may indicate a manager/subordinate relationship, a spousal/personal partnership relationship, a parent/child/sibling relationship, or any other such relationship for pairs of associated users. A contextual feature may indicate one or more social network graphs based on and/or generated from one or more social network platforms that the users employ. A contextual feature may include an indication, such as but not limited to, a static or dynamic link, for materials referenced and/or exchanged in the conversation, such as emails, websites, slide decks, spreadsheets, files, or other such documents, including any multimedia content. Such multimedia content may include electronic books (e-books), audio and/or video files, animations, organization charts, or other such audible, visual, and/or textual content.

A contextual feature may encode one or more contextual tags. For instance, a "social" tag may be encoded in a contextual feature for a CS that is directed towards a social conversation or interaction, whereas "work" and/or "meeting" tags may be a CS contextual feature of a CS that is directed towards a work-related meeting. Contextual features may indicate or encode meeting titles, meeting subjects, meeting agendas, meeting schedules, or other such information indicating the structure and/or topics of a conversation of the CS. A contextual feature may indicate one or more privacy and/or encryption configurations of the CS. A contextual feature for a CS may encode virtually any determinable information that is indicative of a context of the CS.

A contextual feature may encode a "role" or "position" for at least a portion of the users within the CS. For instance, a contextual feature may encode whether a particular user is a "leader," "participant," or an "observer" within the CS. The context of the CS for each user may be based on their role or position within the CS. Thus, the identification of likely relevant content and the summarization of the likely relevant content, for a particular user, may be based on their role or position within the CS, as well as the role or position of each of the other users.

The content and contextual features of a CS may be herein collectively referred to as "CS features" of a CS. CS features may be based on data associated with any of the users participating in the CS, including but not limited to any user profile information for each of the users, such as user-interest and user-activity information. User-activity information may include monitored and/or detected user activity, as well as determined, identified, and/or learned user-activity patterns. For instance, user-activity patterns may be learned based on monitoring and analyzing user activity.

CS features may be based on the content exchanged in the CS, as well as any data, such as but not limited to metadata, associated with the CS. Various ML methodologies may be employed to learn various data models that are employed to determine and/or identify the content and the contextual features of the CS. The embodiments employ various engines, analyzers, detectors, logic, data models, or other such components to determine and/or identify the CS features. Various embodiments of ML methodologies may be employed to train models in the determination and identification of CS features. For instance, various deep-learning (DL) methodologies may be employed to develop and/or train one or more natural language models (NLMs), such as but not limited to topical models, keyword models, and semantic models, to determine both content-substance and content-style features of content lines. The NLMs may include one or more trained content-substance models and one or more content-style models. The content-substance models and the content-style models may be trained based on historical CS content data. Similarly, contextual models may be trained to determine the contextual features of a CS based on historical CS contextual data. A CS feature may be an observable feature or variable. At least a portion of the CS features may include latent and/or hidden features or variables.

A relevance for one or more of the content lines may be determined based on the determined CS features, as well as the user-interest and content-relevance models for the user. The content-relevance model may be trained based on at least the user-interest model for the user, as well as monitored user activity. That is, the user-interest model may be trained based on monitoring and/or detecting user activity and inferring user-activity patterns. Topics for the user's interests may be determined and/or identified based on at least the inferred user-activity patterns. In at least some embodiments, the user may at least curate and/or update their user-interest models based on user profile information.

In order to generate the various data models, data corresponding to user activity may be gathered over time using sensors on one or more user devices associated with the user. From this historical user-activity information, a computer system may learn user-activity patterns associated with the user devices. By analyzing a user-activity pattern, the various data models, such as but not limited to user-interest models and content-relevance models may be inferred that are employed to identify content that is likely relevant to the user. In some cases, the user-activity patterns may be analyzed along with sensor data collected by a user device, and the relevance of content to the user may be inferred based on determining a relevance that is consistent with the determined content-relevance model.

As further described herein, in some embodiments, user devices may employ one or more sensors to generate data relevant to a user's activity via a user device(s). The user activity may be monitored, tracked, and used for determining user-activity patterns. The terms "user-activity pattern" or simply "activity pattern" are used interchangeably and broadly herein and may refer to a plurality of user interactions conducted using one or more user devices, activity by the user on or in connection to one or more user devices, events (including actions) related to user activity, or any type of user activity determinable via a computing device, wherein the plurality of interactions, actions, events, or activity share common features or characteristics. In some embodiments, these in-common features or variables may comprise features characterizing a user activity, time, location, or other contextual information associated with the user activity, as further described herein. Examples of user-activity patterns may include, without limitation, activity patterns based on time (e.g., the user browses his bank's website near the beginning of each month to check his account balance), location (e.g., upon arriving at work in the morning, a user turns down the volume on her phone), content within and/or external to a CS (e.g., a user typically browses news-related websites followed by their social-media related websites), or other context, as described herein.

In some embodiments, the user activity may be related to a user's browsing activity, such as websites, categories of websites, or sequences of websites and/or website categories visited by a user, and user activity associated with the browsing activity. In addition or alternatively, the user activity may be related to a user's application (or app) related activity, such as application usage, which may include usage duration, launches, files accessed via the application or in conjunction with the application usage, or content associated with the application. The terms "application" or "app" are used broadly herein, and generally refer to a computer program or computer application, which may comprise one or more programs or services, and may run on the user's device(s) or in the cloud.

Based on the determined user-activity patterns and other factors, at least a user-interest and/or a content-relevance model may be generated and/or updated. Based on the inferred user-interest model and content-relevance model, as well as other factors, such as the context features of a CS, CS content that is likely relevant to the user may be identified and summarized to provide improved utility and user experiences regarding a CS.

Accordingly, at a high level, in one embodiment, to generate the various data models that enable identifying and summarizing likely relevant content of a CS, user data is received from one or more data sources. The user data may be received by collecting user data with one or more sensors or components on user device(s) associated with a user. Examples of user data, also described in connection to component 210 of FIG. 2, may include information about the user device(s), user activity associated with the user devices (e.g., app usage, online activity, searches, calls, usage duration, and other user-interaction data), network-related data (such as network ID, connection data, or other network-related information), application data, contacts data, calendar and social network data, or nearly any other source of user data that may be sensed or determined by a user device or other computing device. The received user data may be monitored and information about the user activity may be stored in a user profile, such as user profile 240 of FIG. 2.

In some embodiments, based on an identification of one or more user devices, which may be determined from the user data, the one or more user devices are monitored for user activity, including the generation of content within one or more CSs that the user is currently or has previously participated in. In some embodiments, user-activity monitoring may be facilitated using an application or service that runs on the monitored user device. Alternatively or in addition, the user-activity monitoring may be facilitated using an application or service that runs in the cloud, which may scan the user device, or detects online activity associated with the user device, such as HTTP requests or other communication information, or otherwise receive information about user activity from the user device.

User data may be analyzed to detect various features associated with user actions. Detected user actions or "activity events," which may include actions such as websites visited, applications launched, or other actions similar to those described herein, may be logged with associated user-activity contextual data, for example, by logging the observed user action with a corresponding time stamp, location stamp, and/or associating the activity event with other available contextual information. In some embodiments, such logging may be performed on each user device, so that user-activity patterns may be determined across devices. Further, in some embodiments, cloud-based user-activity information sources may be used such as online user calendars or user activities determined from social media posts, emails, or the like. These sources also may be used for providing other user-activity context to the user activity detected on the user devise(s). In some embodiments, user-activity logs from multiple user devices and available user-activity information from cloud-based sources may be combined, thereby representing a composite user-activity history. The user-activity logs, including corresponding user-activity contextual information, may be stored in a user profile associated with the user, such as user profile 240 of FIG. 2.

Figure 2:
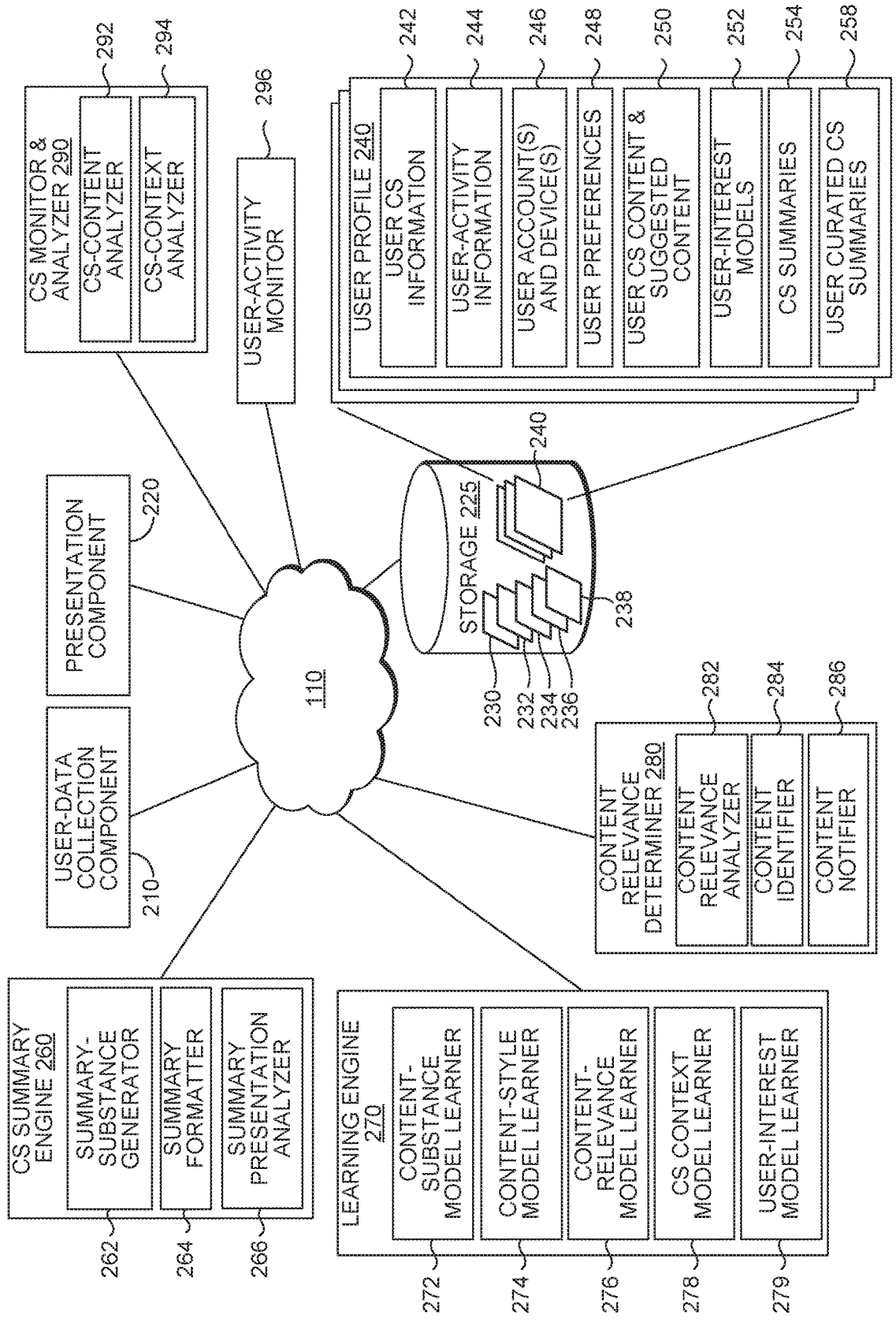
FIG. 2 is a diagram depicting an example computing architecture suitable for implementing aspects of the present disclosure.

From the activity logs or user-activity data, historical user-activity information may be determined and provided to an inference and/or learning engine, such as learning engine 270 of FIG. 2. Based on an analysis of historical user activity, and in some cases current sensor data regarding user activity, at least one of a user-interest model, a content-relevance model, a content-substance model, a content-style model, and a CS context model may be generated, updated, and/or trained. In particular, the learning engine may conduct an analysis of the historical user-activity information to identify the user's topics of interest, as well as content and contextual features that may be employed to identify, highlight, and/or summarize content that is likely relevant to the user.

In some embodiments, the various data models may be employed to determine a corresponding confidence weight or confidence score to one or more CS features that indicate a confidence and/or a probability associated with determining the CS feature. For instance, for a trained user-interest model, an interest confidence score may be based on a likelihood or probability that a particular topic is of interest to the user given the context of the CS and the user's activities, which may be determined by the number of observations used to determine a user-activity pattern associated with the topic, how frequently the user activity is consistent with the topic, the age or freshness of the activity observations, the number of features in common with the activity observations that are associated with the topic, or similar measurements. In some instances, the interest confidence score may be considered when identifying content that is relevant to the user.

Further, in some embodiments, a minimum or maximum confidence score may be needed to determine the CS feature. For example, in one embodiment, a CS feature threshold of 0.6 (or just over fifty percent) is utilized such that only CS features are identified when the associated confidence score corresponds to a 0.6 (or greater) likelihood, confidence, or correlation. Nevertheless, where confidence scores and thresholds are used, CS features with confidence scores less than the threshold may still be employed in the various embodiments. However, these CS features may be deemphasized in the analyses. That is, for each of the determinations and/or identification in the various embodiments, the influence of any single determined CS feature may be weighted based on the associated confidence score.

In some embodiments, crowdsourced training data, including at least user-activity history, may also be utilized in conjunction with the generating and updating of any of the various data models, such as but not limited to the user-interest and the content-relevance models. For example, for a given user, a set of other users similar to the given user may be identified, based on having features or characteristics in common with the given user. This might include other users located in proximity to the given user, the given user's social media friends, work colleagues (which may be determined from an analysis of contextual information associated with the given user), other users with similar user-activity patterns, or the like. Information about the data models from the other users may be relied upon for inferring patterns of user activity for the given user. This may be particularly useful in situations where little user-activity history exists for the given user, such as where the user is a new user. In some embodiments, data models from similar users may be imputed to the new user until enough user history is available for the new user to determine statistically reliable user-interest and content-relevance predictions, which may be determined based on the number of observations included in the user-activity history information or the statistical confidence of the determined user-activity patterns, as further described herein. In some cases, where the data models come from other users, the resulting inferred user interests and content relevance for the given user may be assigned a lower confidence score.

In some embodiments, the determining of a CS feature, a user interest, or a content relevance may be based on a semantic analysis performed on data associated with the CS, such as metadata. For example, CS features may be categorized (such as by type, similar time frame, or location, for example), and related CS features may be identified in determining a relevance of the content. In some embodiments, a semantic knowledge representation, such as a relational knowledge graph, may be employed. In some embodiments, the semantic analysis may use rules, logic such as associations or conditions, or classifiers.

The semantic analysis may also be used to characterize the context of a CS, such as determining that a location associated with the various user activity corresponds to a hub or venue of interest to the user based on frequency of visits, such as the user's home, work, gym, etc. (For example, the user's home hub may be determined to be the location where the user spends most of her time between 8 PM and 6 AM.) Similarly, the semantic analysis may determine time of day that corresponds to working hours, lunch time, commute time, etc.

In this way, the semantic analysis may be employed to determine user interest. For example, in addition to determining a particular website that the user visited at a certain time, such as visiting CNN.com over lunch, the category of the website may be determined, such as a news-related website. Similarly, the semantic analysis may associate the user interest as being associated with work or home, based on the characteristics of the activity (e.g., a batch of online searches about chi-squared distribution that occurs during working hours at a location corresponding to the user's office may be determined to be a work-related interest, whereas streaming a movie on Friday night at a location corresponding to the user's home may be determined to be home-related interest). These aspects characterizing the user's interests may be considered when determining the relevance of content and identifying likely relevant content. For example, an interest in news-related websites may be determined where a user routinely visits news-related websites.

As described previously, the user-activity patterns may be used to infer user-interest and content-relevance data models. From these predictions of user interests and content relevance, various implementations may provide enhanced user experiences. For example, some embodiments may provide timely, relevant delivery or presentation of summarized versions of likely relevant content of a CS, or highlighting urgent content in real time. Other improvements include improvements to user device performance and network bandwidth usage. Some embodiments may be carried out by a personal and/or virtual assistant application or service, which may be implemented as one or more computer applications, services, or routines, such as an app running on a mobile device or the cloud, as further described herein.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may be client devices on the client-side of operating environment 100, while server 106 may be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106, or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a though 104n are described further in connection to user-data collection component 210 of FIG. 2.

Figure 3:
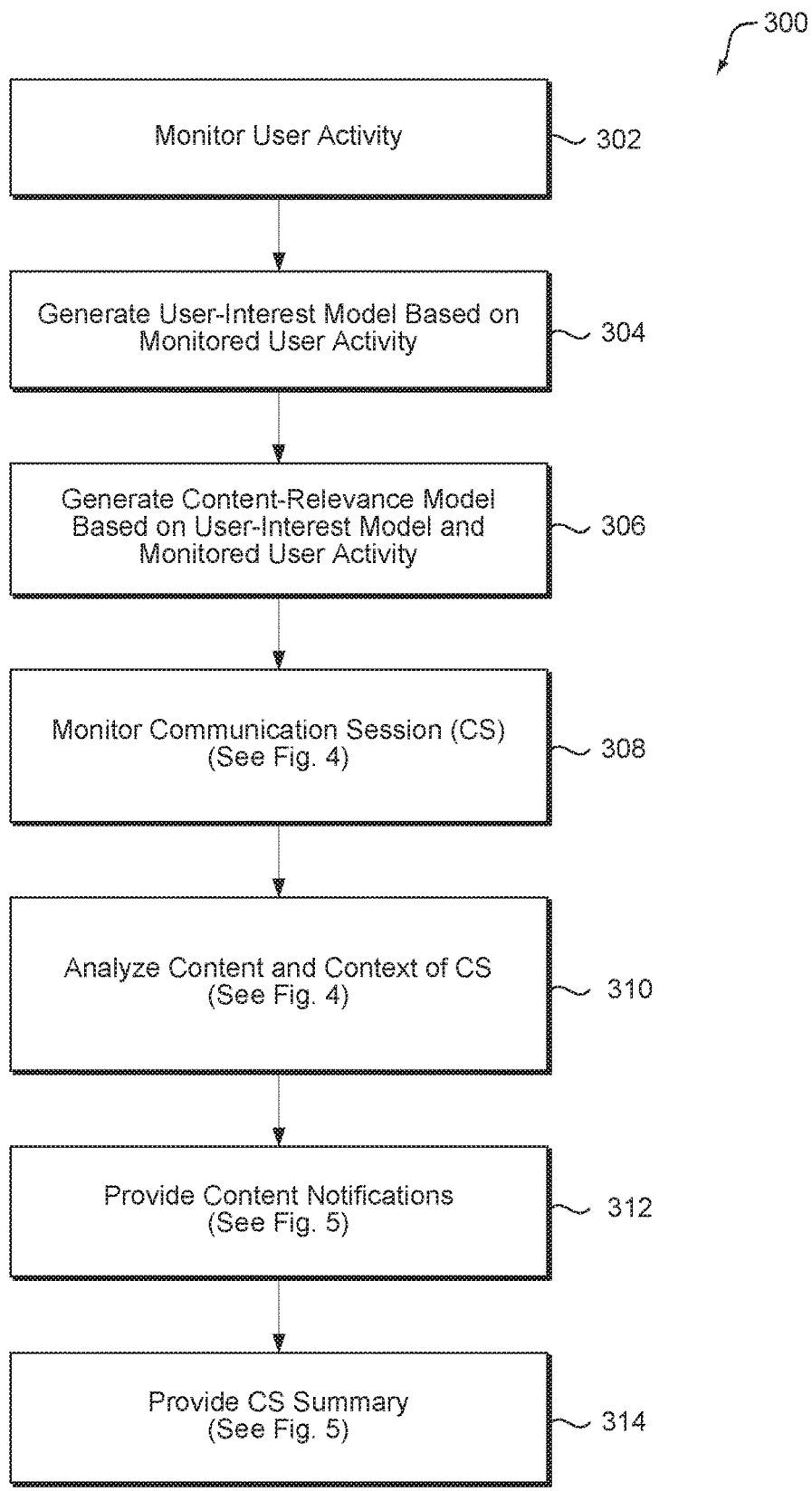
FIG. 3 depicts a flow diagram of a method for providing enhanced communication session services, in accordance with an embodiment of the present disclosure.

Operating environment 100 can be utilized to implement one or more of the components of system 200, described in FIG. 2, and system 300, described in FIG. 3, including components for collecting user data, generating a data model, monitoring and analyzing one or more CSs, and identifying and summarizing relevant content of the one or more CSs.

Referring now to FIG. 2, with FIG. 1, a block diagram is provided showing aspects of an example computing system architecture suitable for implementing an embodiment and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, communication session (CS) monitor and analyzer 290, learning engine 270, CS summary engine 260, content relevance determiner 280, storage 225, and user-activity monitor 296. CS monitor and analyzer 290 (including its subcomponents 292 and 294), user-activity monitor 296, CS summary engine 260 (including its subcomponents 262, 264, and 266), user-data collection component 210, presentation component 220, learning engine 270 (including its subcomponents 272, 274, 276, 278, and 279), and content relevance determiner 280 (including its subcomponents 282, 284, and 286) may be embodied as a set of compiled computer instructions or functions, program modules, computer software services, or an arrangement of processes carried out on one or more computer systems, such as computing device 600 described in connection to FIG. 6, for example. In various embodiments, at least portions of the components of system 200 may be implemented via hardware-based logic components or devices.

In one embodiment, the functions performed by components of system 200 are associated with one or more virtual assistant (VA) or chat-bot applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s).

Alternatively, or in addition, the functionality of these components and/or the embodiments described herein can be performed, at least in part, by one or more hardware, software, middleware, and/or firmware logic components. For example, and without limitation, illustrative types of hardware logic components or devices that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Such hardware, software, middleware, and/or firmware components may include but are not otherwise limited to CS analysis logic 230, CS response logic 232, content-relevance logic 234, CS summary logic 236, and/or ML logic. Additionally, although functionality is described herein with regards to specific components shown in example system 200, it is contemplated that in some embodiments functionality of these components can be shared or distributed across other components.

Learning engine 270 is generally responsible for generating, updating, and/or training the various data models employed to analyze CS content, identify relevant content, and summarize the relevant content. The various components of system 200 may provide training data to learning engine 270 via network 110. In some embodiments, training data may be provided to learning engine 270 via sources not included in system 200. Once generated, the various data models may be implemented by at least a portion of the components of system 200 to analyze, identify, and summarize likely relevant portions of the CS content. The data models generated, updated, or trained via learning engine 270 may include one or more of a content-substance model, a content-style model, a CS context model, a user-interest model, and a content-relevance model.

As used herein, the terms "data model" or "model" may be used interchangeably to refer to one or more descriptions, rules (stochastic or deterministic), functions, modules, components, or the like that are enabled to map input data to output data. That is, a data model may receive input data and generate output data based on the input data and various rules, relationships, correlations, mappings, networks, logic, inductive and/or deductive chains, or other such machinery included in the data model. For instance, in some embodiments, a data model may include a chain or network of Boolean logic operations. In the various embodiments, a data model receives input data, such as but not limited to information derived from the content of a CS, and generates output data, based on the input data. For instance, a data model may generate a list of one or more topics that the discussion encoded in the content is directed towards. Additional output data generated by a data model may include a score or weight associated with each of the topics, where the score indicates a measure of the dominance of significance of the topic within the conversations.

As a non-limiting example, a data model may include a set or list of topics that are weighted with respect to a determined level of interest. For instance, a data model may be embodied as a knowledge graph, such as but not limited to those often employed in search engines. A data model may include a concept or topic map that indicates relationships between concepts or topics. In the various embodiments, a data model may be a parameterized data model. That is, a data model is implemented by the choice of one or more parameters. Such parameters may include various weights, coefficients, or the like.

In some of the embodiments, a data model may be a machine-learning (ML) data model. An ML data model is one that employs data to determine, learn, and/or predict or infer values for the one or more parameters of data. In some instances, an ML data model may be trained via training or baseline data. Once the model has been at least trained in a preliminary sense, the model may be refined and/or updated based on additional data generated via the employment of the model. For instance, an ML data model may be customized to a particular user based on training the ML model with data that is specific to the user. Although the various embodiments may discuss ML data models, it should be understood that the embodiments are not so limited. For instance, a data model may include a collection of data specific to one or more users, a set of rules, a set of heuristics, and one or more deterministic or stochastic algorithms. Such algorithms may include genetic algorithms, i.e., algorithms generated via reproduction, recombining, and/or mutating portions of the algorithm, such that efficient and/or highly predictive portions of the algorithm are advantaged and accumulated through the evolution mechanism.

The various "data models," or simply "models," may include or at least be implemented via various trained networks (or network data models) and/or architectures, such as neural network data models or architectures. An ML data model may include various trained deep-learning networks, such as but not limited to feedforward networks, convolutional/deconvolutional networks, recurrent neural networks (RNNs), recursive neural networks, long-short term memory (LSTM) networks, autoencoders/decoders, and such. The trained ML data models may include various natural language models (NLMs), n-grams, speech-recognition models, text-to-speech models, and such. The ML data models may include linear factor models, vector machines, structured and/or unstructured probabilistic models, partition functions, deep-generative models, and such. In at least one embodiment, an ML data model is trained via one or more Monte Carlo simulation (MCS) or other randomized and/or probabilistic simulation methods. A data model may include various estimators, such as but not limited to maximum likelihood estimator or a Bayesian estimator. One or more data models may be based off state machine or a Markov process. For instance, a data model may include a Markov chain. The various ML data models may be generated via supervised and/or unsupervised learning methodologies.

As such, the various ML data models may include the parameters (e.g., weights) determined via the training process, as well as any network structure indicating the relationships between the various nodes, neurons, or the like of any network, map, graph, or other such structure, topology, and/or architecture that is associated with and/or enables any of the various data models. Other ML and/or artificial intelligence (AI) methodologies may be employed to generate, update, and/or train the various ML data models.

Briefly, a content-substance model learner 272 may generate, update, and/or train a content-substance natural language model. Content-style model learner 274 may generate, update, and/or train a content-style natural language model. A CS context model learner 278 may generate, update, and/or train a CS context natural language model. Such natural language models may be generated and/or updated based on training data that includes the content of various CSs. That is, content from a CS log, as well as other data associated with a CS, such as metadata, may be employed to train these natural language models.

A user-interest model learner 279 may generate, update, and/or train a user-interest model. User-activity information, such as but not limited to user-activity information 244 and other information from user profile 240, may be employed to generate the user-interest models. A content-relevance model learner 276 may generate, update, and/or train a content-relevance model based on the user-interest model and other information associated with the user, such as user-activity information and/or user-activity patterns. Accordingly, the user-interest and content-relevance models may be targeted to a specific user based on the selection of training data employed to generate and/or update the data models.

One or more of the trained data models may be stored in user profile 240. For instance, user-interest model 252 is stored in user profile 240. ML logic 238 may implement or otherwise enable the various ML methodologies employed by learning engine 270. That is, at least one of content-substance model learner 272, content-style model learner 274, content-relevance model learner 276, CS context model learner 278, and/or user-interest model learner 279 may be implemented via hardware, software, middleware, and/or firmware logic included in ML logic 238. For example, ML logic 238 may enable the various neural networks employed in the training of the various data models. Although ML logic 238 is shown included in storage 225, in other embodiments, ML logic 238 may be embedded and/or instantiated in other components of system 200, such as but not limited to learning engine 270.

CS monitor and analyzer 290 is generally responsible for monitoring and analyzing the content and context of the one or more CSs that the user is currently participating in, or has previously participated in. As such, CS monitor and analyzer 290 may receive various data associated with each CS that the user is or has participated in. The various received data may include at least the content and metadata associated with the CS. CS monitor and analyzer 290 may include various subcomponents, such as but not limited to CS-content analyzer 292 and CS-context analyzer 294. The functionalities and/or features of data models associated with the subcomponents of CS monitor and analyzer 290 may be enabled and/or implemented via CS analysis logic 230. That is, CS analysis logic 230 may implement the various analyses for determining the substance and style of the content, as well as the context of the CS as described in conjunction with the various embodiments. As such, CS analysis logic 230 may implement various NLP methodologies, neural network architectures, and/or statistical models. Although CS analysis logic 230 is shown included in storage 225, in other embodiments, CS analysis logic 230 may be embedded and/or instantiated in other components of system 200, such as but not limited to the various subcomponents of CS monitor and engine 290.

CS-content analyzer 292 may analyze, in real time or near real time, both the substance and style of the content of the one or more CSs. The analyses may be based on the content-substance and content-style models, as well as various other models and/or analyses to determine both the substance and the style of the content from each of the users participating in each of the CSs. The CS-context analyzer 294 may analyze the context of the one or more CSs, via the CS context model, as well as various other models and/or analyses.

More particularly, the CS-content analyzer 292 may analyze, in real time or near real time, each content line (or blocks of content lines) of each CS that a user is or has participated in. CS-content analyzer 292 may determine the substance and style of each content line, as well as the conversation as a whole, carried out within the CS based on at least the content-substance model and the content-style model, as well as other natural language processing (NLP) methodologies. The content-substance and content-style models may include a combination of one or more natural language models (NLM), including but not limited to n-grams, neural language models, maximum entropy language models, and such. Such NLMs may be based on ML methodologies, such as but not limited to deep learning (DL) methodologies. Thus, the various data models may employ and/or be implemented via neural networks, such as but not limited to feedforward networks and RNNs, including an LSTM.

The content-substance model is employed to determine the substance of the content. Accordingly, the content-substance model may be a combination of one or more semantic language models, including but not limited to topic models and keyword models. For instance, a topic model may enable a determination of a nested hierarchy of topics that the conversation embedded in the content is directed to. A confidence score may be associated with each of the topics, wherein the associated confidence score indicates a confidence and/or probability that the content is indeed directed to the topic. Based on the received content and the one or more content-substance models, CS-content analyzer 292 may determine one or more observable, hidden, and/or latent content features, such as but not limited to content-substance and content-style features. Determining such content features via the various data models may be based on data associated with any of the users participating in the CS, including but not limited to any user profile information for each of the users (e.g., user profile 240), such as user-interest and user-activity information. As discussed below, user-activity information may include monitored and/or detected user-activity, as well as determined, identified, and/or learned user-activity patterns. For instance, user-activity patterns may be learned based on monitoring and analyzing user activity. Content features may be based on the content exchanged in the CS, as well as any data, such as but not limited to metadata, associated with the CS.

A content feature may include an indication of the speaker of one or more content lines, as well as an indication of the user or group of users that the content lines are directed at. For instance, if the content line includes a question directed at a particular user or group of users, a content feature for the content line may include the particular user or group of users. A content feature may also include one or more indications of whether the content line includes one or more declarative statements, expository statements, questions, responses to questions, and such.

The content-substance features indicate the semantics or meanings of the natural language utterances or expressions embedded in the conversations carried out via the CS. That is, the content-substance features may indicate topics being conversed about, as well as the intentioned meaning and the sentiments of the conversation. One or more determined content-substance features may be associated with an isolated content line, a block of content lines associated with the same or separate speakers, or the entire conversation.

In contrast, the determined content-style features of one or more content lines may encode or represent the stylistic (e.g., grammatical) choices of the speaker of the content line. That is, content-style features may indicate grammar, vocabulary, and dialogue choices of the speaker. For instance, content-style features may encode the speaking style of the speaker. Content-style features may additionally encode one or more emotions of the speaker, e.g., anger, surprise, satisfaction, happiness, and other emotions. Content-style features may indicate the intonation, speed, and volume of the speaker.

The CS-context analyzer 294 may analyze, in real time or near real time, the context of the CS. The CS-context analyzer 294 may determine contextual features of the CS based on a CS context model and data, such as metadata, associated with the CS. Contextual features for a CS may include, but are not otherwise limited to, an indication or encoding of each of the users participating in and/or associated with the CS, an activity and/or engagement level of each of the associated users, and an availability of each of the associated users. Contextual features may additionally indicate initiating and terminating time stamps of the CS, the temporal duration of the CS, and an indication of other past or current CSs that the associated users have or are currently participating in. Additional contextual features may indicate an approximate geo-location and/or logical location of each associated users. A CS contextual feature may include or be based on any user profile information for each of the associated users.

A contextual feature for a CS may indicate or encode a hierarchical relational graph or map that indicates one or more relationships or mapping between at least some of the pairs of associated users of the CS. An indicated relationship may include a professional, personal, or genetic relationship. For instance, the relational graph may indicate a manager/subordinate relationship, a spousal/personal partnership relationship, a parent/child/sibling relationship, or any other such relationship for pairs of associated users. A contextual feature may indicate one or more social network graphs based on and/or generated from one or more social network platforms that the users employ. A contextual feature may include an indication, such as but not limited to a static or dynamic link, for materials referenced and/or exchanged in the conversation, such as emails, websites, slide decks, spreadsheets, files, or other such documents, including any multimedia content. Such multimedia content may include electronic books (e-books), audio and/or video files, animations, organization charts, or other such audible, visual, and/or textual content.

A contextual feature may include one or more contextual tags. For instance, a "social" tag may be contextual feature for a CS that is directed towards a social conversation or interaction, whereas "work" and/or "meeting" tags may be a CS contextual feature of a CS that is directed towards a work-related meeting. Contextual features may indicate or encode meeting titles, meeting subjects, meeting agendas, meeting schedules, or other such information indicating the structure and/or topics of a conversation of the CS. A contextual feature may indicate one or more privacy and/or encryption configurations of the CS. A contextual feature for a CS may encode virtually any determinable information that is indicative of a context of the CS.

Content relevance determiner 280 and its subcomponents are generally responsible for determining the relevance of the content of one or more CSs, identifying content that is likely to be relevant to the user, and notifying the user, in real time, regarding any content that is identified as highly relevant and/or urgent to the user. As such, content relevance determiner 280 may receive the content, as well as the determined CS features (e.g., CS content features and contextual features) from the CS monitor and analyzer 290. Determining the relevance of the content may be based on the content features and the contextual features, as well as monitored user activity, the user-interest model, and the content-relevance model.

The trained user-interest model may be employed to determine the user's interests, i.e., one or more topics that are of interest to the user based on the context of the CS, e.g., the contextual features of the CS. Based on the user-interest model and the contextual features of the CS, one or more topics of interest may be scored and/or ranked via a weighting or interest score for the topic. The determined topics may be based on various contexts of a CS. For instance, the determined user interests for a CS that has an employment-related context may be separate from the user interests for a CS that has a more personal-related context. Thus, the user interest, as determined via the user-interest model may be dependent upon the context of the one or more CSs.

More particularly, the user-interest model may probabilistically predict and/or infer a hierarchical representation (such as a graph or a map) of the user's interests. Via the user-interest model, a hierarchy of the user's interests may be modeled as one or more directed or undirected graphs of trees. For each of a plurality of topics, the user-interest model may predict a normalized interest score or weight for the user's interest in the topic. The interest score may indicate a probabilistic correlation between the user's interests and the topic. The probabilistic correlation may be based on as least monitored user activity, as well as others factors discussed herein.

The plurality of topics, as determined via the user-interest model, may be arranged in a cascading hierarchy that includes a plurality of nested subtopics. At least some topics may be positioned in multiple locations in one or more cascading tree-graphs and have separate associated interest scores. For instance, a first set of topics may be associated with the user's employment. That is, each of the topics in the first set of topics is positioned in one or more branches of a tree-graph descending from a node associated with the user's employment. A separate set of topics may be associated with the user's hobbies. That is, each of the topics in the second set of topics is positioned in one or more branches of the same or another tree-graph descending from another node that is associated with the user's employment. The intersection of the first and second topic sets may be a non-empty set. For instance, Topic_A may be included in each of the first and second topic sets. The interest score for Topic_A descending from the user's employment node may be different than the interest score for Topic_A descending from the user's hobbies node. As discussed throughout, identified CS contextual features may be employed to determine which interest score for Topic_A is relevant for a particular CS.

It should be understood that the various structures of a user-interest model discussed herein are exemplary, and other interest-user models may be employed. Essentially, a user-interest model quantifies the user's interest in one or more topics, which may be encoded in a content-substance feature of the content.

A content-relevance model enables the determination of relevance for a portion of content, such as one or more content lines. A relevance for content may include one or more probabilities, wherein the one or more probabilities correlate with the likelihood that the content is relevant to the user. The one or more probabilities may be structured as a normalized scalar, vector, a matrix, a tensor, or some other data structure such as a multidimensional array. Each component of the data structure indicates a probability that the content is relevant to the user, with respect to one or more of the user's interests. At least one component of the determined content relevance may indicate a temporal urgency of the content. That is, the component indicates that the content is of an urgent nature to the user and the content should be brought to the user's attention very soon. In at least one embodiment, a relevance for content includes an overall relevance that is a combination of the one or more probabilities corresponding to the various topics of interest to the user.

It should be understood that the various structures of a content-relevance model discussed herein are exemplary, and other content-relevance models may be employed. Essentially, a content-relevance model quantifies one or more probabilities regarding the relevance and the temporal urgency of content, such as a content line or a block of one or more content lines. That is, a content relevance model enables a mechanism for determining and/or identifying the content of a CS that is likely to be relevant, based on the analyzed content and the context of the CS, as well as the user's interests and activities.

Content relevance determiner 280 employs data models such as but not limited to the user-interest model and the content-relevance model to determine the relevance of the content of one or more CSs, identify likely relevant and/or highly relevant content for the user, and provide the user notifications for the identified highly relevant content. Content relevance determiner 280 may include various subcomponents, such as but not limited to content relevance analyzer 282, content identifier 284, and content notifier 286. The functionalities of and/or data models associated with the subcomponents of the content relevance determiner 280 may be enabled and/or implemented via content-relevance logic 234. That is, content-relevance logic 234 may implement the various analyses for determining the relevance of each portion of CS content, identifying the portions of the content that are likely relevant to the user, based on the determined relevance, and providing one or more notifications of content that are identified as highly relevant, as described in conjunction with the various embodiments. As such, content-relevance logic 234 may implement various NLP methodologies, neural network architectures, and/or statistical models. Although content-relevance logic 234 is shown included in storage 225, in other embodiments, content-relevance logic 234 may be embedded and/or instantiated in other components of system 200, such as but not limited to the various subcomponents of content relevance determiner 280.

More particularly, content relevance analyzer 282 determines a relevance for at least portions of the received content. As noted above, the relevance for a portion of content may include one or more probabilities, wherein the one or more probabilities correlate with the likelihood that the content is relevant to the user. The determined relevance may be based on the content-relevance model, as well as the user-interest model, and the determined CS features, such as but not limited to contextual features of the CS and the content features of the content. Accordingly, content relevance analyzer 282 may receive the contextual features, as well as the content-substance and content-style features from the CS monitor and analyzer 290.

The content identifier 284 may determine and/or identify content that is likely relevant to the user based on the determined relevance for each portion of the content. Identifying the likely relevant content may be based on one or more relevance thresholds. That is, content may be identified as likely relevant if one or more of the relevant probabilities or scores is greater than a relevance threshold. In at least one embodiment, the content may be identified as likely relevant if the overall relevance is greater than an overall relevance threshold. In some embodiments, the content may be identified as likely relevant if the probability corresponding to the temporal urgency is greater than an urgency threshold.

One or more relevance thresholds may be provided by the user via user preferences 248 and/or other information included in user profile 240.

In other embodiments, the likely relevant content may be identified based on other methods. In at least one embodiment, determining the likely relevant content may be based on ML methodologies. For instance, the user may manually curate an automatically generated CS summary and/or provide manually generated CS summaries. The curated and/or manually generated summaries may be stored in user curated CS summaries 258 and may serve as "ground-truth" summaries. Various ML methodologies may learn data models to learn to identify the likely relevant content. In at least one embodiment, using manually curated CS summaries as "ground-truth" summaries enables the automatic determination of one or more relevance thresholds.

The content identifier 284 may identify at least portions of the content as highly relevant to the user if at least one of the relevant probabilities is greater than a highly relevant threshold, which may be greater than a threshold employed to identify likely relevant content. That is, the portions of the content that are identified as highly relevant may be a subset of the portions of content that are identified as likely relevant. In at least one embodiment, content may be identified as highly relevant if the probability corresponding to the temporal urgency is greater than an urgency threshold.

For content that is identified as highly relevant to the user, the various embodiments may provide, real-time and/or near real-time, audible and/or visual notifications or prompts to call the user's attention to the content. Content notifier 286 may enable providing the user with such notifications. When a user is simultaneously participating in multiple CSs distributed across multiple windows or user interfaces, content notifier 286 may highlight or position the user interface that includes identified highly urgent content in the foreground of the user's display device. The user's attention may further be directed to the highly urgent content with additional selective-highlighting within the user interface that is now in the display device's foreground. Thus, content notifier 286 may highlight CS content that is highly relevant to the user, where the identification of highly relevant content is targeted to the specific user via content identifier 284. In at least one embodiment, the notification to highlight highly relevant content may be provided via automatically generated speech. The speech-based notification may include the highly relevant content, a summarized version of the highly relevant content, or simply a spoken, or otherwise audible, indication to direct the user's attention to a specific user interface.

The content relevance determiner 280 may determine contextual features that are external to the CS. The user's location is one exemplary external contextual feature, e.g., the user's current location may be compared to their residence or workplace to generate additional contextual features. For instance, an external contextual feature may be determined when a user resides in the U.S. but is visiting Paris. Such external contextual features may be employed to identify content relating to Paris likely-relevant in such scenarios, wherein in other contexts, Paris related content may not be relevant to the user.

CS summary engine 260 is generally responsible for generating the summary of the CS and providing the summary to the user. The functionalities and/or operations of CS summary engine 260 may be implemented via CS summary logic 236. More particularly, the summary-substance generator 262 may generate the substance of summarized versions of the likely relevant content portions. Summary formatter 264 may format the style of the summarized versions of the likely relevant content portions. Summary presentation analyzer 266 may aggregate the formatted summarized versions of the likely relevant content portions and generate the summary of the CS from the aggregated summarized versions. Presentation component 220 may provide the summary of the CS to the user. The presentation component 220 may provide the summary of the CS to the user in a textual format and/or via audible speech that is automatically generated via text-to-voice services enabled by the presentation component 220.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for user-activity detector 296, content-relevance model learner 276, or a user-interest model learner 279. The data may be received (or accessed), and optionally accumulated, reformatted, and/or combined, by user-data collection component 210 and stored in one or more data stores such as storage 225, where it may be available to other components of system 200. For example, the user data may be stored in or associated with a user profile 240, as described herein. In some embodiments, any personally identifying data (i.e., user data that specifically identifies particular users) is either not uploaded or otherwise provided from the one or more data sources with user data, is not permanently stored, and/or is not made available to user-activity monitor 296 and/or learning engine 270.

User data may be received from a variety of sources where the data may be available in a variety of formats. For example, in some embodiments, user data received via user-data collection component 210 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user data associated with communication events; etc.) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

User-activity monitor 296 is generally responsible for monitoring user data for information that may be used for determining user-activity information, which may include identifying and/or tracking features (sometimes referred to herein as "variables") or other information regarding specific user actions and related user-activity contextual information. Embodiments of user-activity monitor 296 may determine, from the monitored user data, user activity associated with a particular user. As described previously, the user-activity information determined by user-activity monitor 296 may include user-activity information from multiple user devices associated with the user and/or from cloud-based services associated with the user (such as email, calendars, social-media, or similar information sources), and which may include contextual information associated with the identified user activity. User-activity monitor 296 may determine current or near real-time user-activity information and may also determine historical user-activity information, in some embodiments, which may be determined based on gathering observations of user activity over time, accessing user logs of past activity (such as browsing history, for example). Further, in some embodiments, user-activity monitor 296 may determine user activity (which may include historical activity) from other similar users (i.e., crowdsourcing), as described previously.

In some embodiments, information determined by user-activity monitor 296 may be provided to any of learning engine 270, CS summary engine 260, CS monitor and analyzer 290, and/or content relevance determiner 280. As described previously, user activity features may be determined by monitoring user data received from user-data collection component 210. In some embodiments, the user data and/or information about the user activity determined from the user data is stored in a user profile, such as user profile 240.

In an embodiment, user-activity monitor 296 comprises one or more applications or services that analyze information detected via one or more user devices used by the user and/or cloud-based services associated with the user, to determine activity information and related contextual information. Information about user devices associated with a user may be determined from the user data made available via user-data collection component 210, and may be provided to user-activity monitor 296, CS summary engine 260, or other components of system 200.

More specifically, in some implementations of user-activity monitor 296, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of user-activity monitor 296, or its subcomponents, may determine a device name or identification (device ID) for each device associated with a user. This information about the identified user devices associated with a user may be stored in a user profile associated with the user, such as in user accounts and devices 246 of user profile 240. In an embodiment, the user devices may be polled, interrogated, or otherwise analyzed to determine information about the devices. This information may be used for determining a label or identification of the device (e.g., a device ID) so that user interaction with the device may be recognized from user data by user-activity monitor 296. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

User-activity monitor 296 may comprise a user-activity detector and other sub-components such as a user-activity contextual information extractor. In some embodiments, user-activity monitor 296, one or more of its subcomponents, or other components of system 200, such as learning engine 270 may determine interpretive data from received user data. Interpretive data corresponds to data utilized by these components of system 200 or subcomponents of user-activity monitor 296 to interpret user data. For example, interpretive data can be used to provide other context to user data, which can support determinations or inferences made by the components or subcomponents. Moreover, it is contemplated that embodiments of user-activity monitor 296, its subcomponents, and other components of system 200 may use user data and/or user data in combination with interpretive data for carrying out the objectives of the subcomponents described herein. Additionally, although several examples of how user-activity monitor 296 and its subcomponents may identify user-activity information are described herein, many variations of user-activity identification and user-activity monitoring are possible in various embodiments of the disclosure.

User-activity monitor 296, in general, is responsible for inferring one or more user-activity patterns based on monitoring the user activity. Embodiments of user-activity monitor 296 may be used for determining current user activity or one or more historical user actions. Some embodiments of user-activity monitor 296 may monitor user data for activity-related features or variables corresponding to user activity such as indications of applications launched or accessed, files accessed, modified, copied, etc., websites navigated to, online content downloaded and rendered or played, or similar user activities.

Additionally, some embodiments of user-activity monitor 296 extract from the user data information about user activity, which may include current user activity, historical user activity, and/or related information such as contextual information. Alternatively or in addition, in some embodiments, user-activity monitor 296 determines and extracts user-activity contextual information. Such user activity includes user-activity related features, based on an identification of the activity determined by user-activity monitor 296. Examples of extracted user-activity information may include app usage, online activity, searches, calls, usage duration, application data (e.g., emails, messages, posts, user status, notifications, etc.), or nearly any other data related to user interactions with the user device or user activity via a user device. Among other components of system 200, the extracted user-activity information determined by user-activity monitor 296 may be provided to other components of system 200. Further, the extracted user activity may be stored in a user profile associated with the user, such as in user-activity information component 244 of user profile 240. In some embodiments, user-activity monitor 296 performs conflation on the detected user-activity information. For example, overlapping information may be merged and duplicated or redundant information eliminated.

In some embodiments, information received by the user-activity monitor 296 may be used to generate, update, and/or train any of the various data models discussed herein, including at least a user-interest model and a content-relevance model. The functionalities and/or operations of user-activity monitor 296 may be enabled via user-activity logic. In some embodiments, user-activity monitor 296 employs user-activity event logic, which may include rules, conditions, associations, classification models, or other criteria. The activity event logic can take many different forms depending on the mechanism used to identify an activity event. For example, the user-activity event logic could be training data used to train a neural network that is used to evaluate user data to determine when an activity event has occurred. The activity event logic may comprise fuzzy logic, neural network, finite state machine, support vector machine, logistic regression, clustering, or machine-learning techniques, similar statistical classification processes, or combinations of these to identify activity events from user data. For example, activity event logic may specify types of user device interaction information that are associated with an activity event, such as navigating to a website, composing an email, or launching an app. In some embodiments, a series or sequence of user device interactions may be mapped to an activity event, such that the activity event may be detected upon determining that the user data indicates the series or sequence of user interactions has been carried out by the user.

In some embodiments, activity event logic may specify types of user-device related activity that is considered user activity, such as activity that happens while a user is logged into the user device, while user interfaces are receiving input (e.g., while a computer mouse, touchpad, screen, voice-recognition interface, or the like are active), or certain types of activity like launching applications, modifying files with applications, opening a browser and navigating to a website, etc. In this way, the activity event logic may be used to distinguish genuine user activity from automated activity of processes running on the user devices, such as automatic updates or malware scanning. Once a user activity is determined, these features or additional related features may be detected and associated with the detected activity for use in determining activity patterns.

In some embodiments, user-activity monitor 296 runs on or in association with each user device for a user. User-activity monitor 296 may include functionality that polls or analyzes aspects of the operating system to determine user activity related features (such as installed or running applications or file accesses and modifications, for example), network communications, and/or other user actions detectable via the user device including sequences of actions.

In some embodiments, such as the embodiment shown in system 200, user-activity monitor 296 includes subcomponents comprising an app activity logging pipeline and a browse activity logging pipeline. These logging pipelines may be embodied as client-side applications or services that run on each user device associated with a user, and in some embodiments may run in conjunction with applications or inside (or as a part of) applications, such as within a browser or as a browser plug-in or extension. App activity logging pipeline, in general, manages logging of a user's application (or app) activity, such as application download, launch, access, use (which may include duration), file access via the application, and in-application user activity (which may include application content). Browse activity logging pipeline, in general, manages logging of a user's browse activity, such as websites visited, social media activity (which may include browse-type activity conducted via specific browsers or apps like the Facebook® app, Twitter® app, Instagram® app, Pinterest® app, etc.), content downloaded, files accessed, and other browse-related user activity. In some embodiments, each browser on a user device is associated with an instance of browse activity logging pipeline, or alternatively a plug-in or service that provided browse information to a single instance of browse activity logging pipeline on the user device. In some embodiments, app and browse activity logging pipelines may also perform functionality such as logging time stamps, location stamps, user-device related information, or other contextual information that is associated with the logged app activity or browse activity. In some embodiments, app and browse activity logging pipelines upload logged user-activity information to learning engine 270 and/or store the logged activity information in a user profile associated with the user, such as in user-activity information component 244 of user profile 240.

An activity pattern inference engine included in user-activity monitor 296 may be generally responsible for determining user-activity patterns based on the user-activity information determined from user-activity monitor 296. In some embodiments, the activity pattern inference engine may run on a server, as a distributed application across multiple devices, or in the cloud. At a high level, the activity pattern inference engine may receive user activity-related information, which may be uploaded from user-activity logs from client-side applications or services associated with user-activity monitor 296. One or more inference algorithms may be applied to the user activity-related information to determine a set of likely user-activity patterns. For example, patterns may be determined based on similar instances of observation of user activity or associated contextual information, which may be referred to as "in-common features" of user activity-related information. The inferred activity pattern information may be provided to learning engine 270 and/or used to generate, update, and/or train the various data models discussed herein, including at least a user-interest model and/or a content-relevance model. In some embodiments, a corresponding confidence is also determined for the patterns, as described herein. Further, the activity pattern may comprise a single user activity likely to occur, or a sequence of user actions, or probabilities for more than one future action, for example, an eighty percent likelihood that the next action will be browsing to website A and a fifteen percent likelihood that the next action will be launching a music player application, and a five percent likelihood that the next action will be browsing to website B.

In some embodiments, user-activity patterns may be determined by monitoring one or more activity features, as described previously. These monitored activity features may be determined from the user data described previously as tracked variables or as described in connection to user-data collection component 210. In some cases, the variables can represent context similarities and/or semantic similarities among multiple user actions (activity events). In this way, user-activity patterns may be identified by detecting variables or features in common over multiple user actions. More specifically, features associated with a first user action may be correlated with features of a second user action to determine a likely pattern. An identified feature pattern may become stronger (i.e., more likely or more predictable) the more often the user-activity observations that make up the pattern are repeated. Similarly, specific features can become more strongly associated with a user-activity pattern as they are repeated.

Example system 200 also includes a presentation component 220 that is generally responsible for presenting the summaries of the CSs, as well as notifications of highly relevant content to the user. In some embodiments, the presentation component 220 may provide the content that is exchanged in the CS to the user. Presentation component 220 may comprise one or more applications or services on a user device, across multiple user devices, or in the cloud. For example, in one embodiment, presentation component 220 manages the presentation of CS summaries to a user across multiple user devices associated with that user. Based on content logic, device features, associated logical hubs, inferred logical location of the user, and/or other user data, presentation component 220 may determine on which user device(s) a CS summary is presented, as well as the context of the presentation, such as how (or in what format and how much of the CS summary, which can be dependent on the user device or context) it is presented, when it is presented, etc. In particular, in some embodiments, presentation component 220 applies content logic to device features, associated logical hubs, inferred logical locations, or sensed user data to determine aspects of content presentation.

In some embodiments, presentation component 220 generates user interface features associated with one or more CSs. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

As described previously, in some embodiments, a virtual assistant service or chat-bot application operating in conjunction with presentation component 220 determines when and how (e.g., presenting when the user is determined to be at a specific logical location) to present the summary of the CS and/or notifications of real-time content.

Example system 200 also includes storage 225. Storage 225 generally stores information including data, computer instructions (e.g., software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or may be in the cloud.

As shown in example system 200, storage 225 includes user profiles 240. One example embodiment of a user profile 240 is illustratively provided in FIG. 2. Example user profile 240 includes information associated with a particular user such as information about user accounts and devices 246, user preferences 248, user-interest models 252, various CS summaries 254, and manually curated CS summaries 258. The information stored in user profile 240 may be available to learning engine 270 or other components of example system 200.

As described previously, user profile 240 may generally include information about user actions or activity events, related contextual information, activity features, or other information determined via user-activity monitor 296, and may include historical or current user-activity information. User accounts and devices 246 generally includes information about user devices accessed, used, or otherwise associated with a the user, and/or information related to user accounts associated with the user, for example, online or cloud-based accounts (e.g., email, social media) such as a Microsoft® Net Passport, other accounts such as entertainment or gaming-related accounts (e.g., Xbox Live, Netflix, online game subscription accounts, etc.), user data relating to accounts such as user emails, texts, instant messages, calls, other communications, and other content; social network accounts and data, such as news feeds; online activity; and calendars, appointments, application data, other user accounts, or the like. Some embodiments of user accounts and devices 246 may store information across one or more databases, knowledge graphs, or data structures. As described previously, the information stored in user accounts and devices 246 may be determined from user-data collection component 210 or user-activity monitor 296 (including one of its subcomponents).

User preferences 248 generally include user settings or preferences associated with user-activity monitoring. By way of example and not limitation, such settings may include user preferences about specific activities (and related information) that the user desires be explicitly monitored or not monitored or categories of activities to be monitored or not monitored, crowdsourcing preferences, such as whether to use crowdsourced information, or whether the user's activity pattern information may be shared as crowdsourcing data; preferences about which activity pattern consumers may consume the user's activity pattern information; and thresholds, and/or notification preferences, as described herein Turning to FIG. 3, a flow diagram is provided illustrating one example method 300 for providing enhanced communication session services in accordance with an embodiment of the present disclosure. Each block or step of method 300 and other methods described herein comprises a computing process that may be performed using any combination of hardware, firmware, middleware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few. Accordingly, method 300 may be performed by one or more computing devices, such as a smartphone, a virtual assistant (VA) device, or other user device, a server, or by a distributed computing platform, such as in the cloud. The activity pattern may be inferred through the analysis of signal data (or user data) gathered from one or more user devices associated with the user.

Embodiments of block or step 302 may monitor user activity of a user participating in one or more communication sessions (CSs). In some embodiments, the user may employ any of devices 102*a*-102*n* of FIG. 1 to participate in the one or more CSs. The user may be exchanging content with other users participating in the one or more CSs, wherein the other users are employing other devices to participate in the one or more CSs. The content may include one or more natural language expressions and/or utterances that encode a conversation carried out by the user and the other users. A user-activity monitor, such as but not limited to user-activity monitor 296 of FIG. 2, may be employed to monitor the user activity of the user. As discussed in the various embodiments, monitoring the user activity of the user may include determining, identifying, and/or inferring one or more user-activity patterns of the user.

At step 304, a user-interest model for the user may be generated based on the monitored user activity. For instance, at least one of the various user-interest models discussed herein may be generated, updated, and/or trained based on the inferred one or more user-activity patterns of the users, as well various other information, such as but not limited to any information included in user profile 240 of FIG. 2. In at least one embodiment, one or more components of a learning engine, such as but not limited to learning engine 270 of FIG. 2, may generate the user-interest model. For instance, user-interest model learner 279 of FIG. 2 may train the user-interest model based on the monitored user activity.

At step 306, a content-relevance model for the user may be generated based on at least one or the user-interest model and/or the monitored user activity. For instance, at least one of the various content-relevance models discussed herein may be generated, updated, and/or trained based on the generated user-interest model and the inferred one or more user-activity patterns of the users, as well as various other information, such as but not limited to any information included in user profile 240. In at least one embodiment, one or more components of a learning engine, such as but not limited to learning engine 270, may generate the user-interest model. For instance, content-relevance model learner 279 may train the content-relevance model based on the user-interest model, as well as information culled from user profile 240. One or more knowledge maps or concept maps may be employed to generate the content-relevance models. A concept map may indicate relationships between various concepts and ideas. For instance, a knowledge map or a concept map may be queried based on the results of NLP processing of CS content included in a training data set. More specifically, a concept map may be queried to determine ideas that are in relationships to concepts (embedded in the conversation) that are determined via an NLP analysis of the training content or vice versa. A knowledge graph provides a mapping between semantic knowledge and people, places, and things. Similar to the case of a concept map, a knowledge graph may be queried to pair and/or associate semantic knowledge with topics or concepts discussed in the conversation embedded in the training content.

At step 308, the one or more CSs are monitored. Various embodiments for monitoring a CS are discussed in conjunction with process 400 of FIG. 4. However, briefly here, monitoring a CS may include receiving at least a portion of the content that is exchanged by a plurality of users participating in the CS. Monitoring a CS may also include receiving other data or information associated with the CS, such as but not limited to metadata of the CS. At least some of the other received data may be associated with a context of the CS for the user. A CS monitor, such as but not limited to CS monitor and analyzer 290 of FIG. 2, may monitor the one or more CSs.

At step 310, the content and/or the context of the one or more CSs are analyzed. Various embodiments for analyzing the content and the context of a CS are discussed in conjunction with process 400 of FIG. 4. However, briefly here, analyzing the content of a CS may include determining one or more content features, such as but not limited to content-substance and content-style features. Such content features may indicate at least a portion of the intended semantics of the natural language expressions and/or utterances included in the content. A CS analyzer, such as but not limited to CS monitor and analyzer 290, may be employed to analyze at least one of the content and/or the context of the CS.

At step 312, one or more content notifications are provided to the user. Various embodiments of providing a content notification to the user are discussed in conjunction with process 500 of FIG. 5. However, briefly here, based on the analyzed content and context of the CS, various portions of the content may be identified as likely relevant to the user, or even highly relevant to the user. When content is identified as highly relevant to the user, one or more real-time (or near real-time) notifications of the highly relevant content may be provided to the user. A content relevance engine, such as but not limited to content relevance determiner 280 of FIG. 2, may enable providing the notification to the user.

At step 314, a summary of the CS, or a CS summary, is provided to the user. Various embodiments of providing a CS summary to the user are discussed in conjunction with process 500 of FIG. 5. However, briefly here, the CS summary may be generated based on at least the identified portions of the content that are likely relevant to the user. A CS summary engine, such as but not limited to CS summary engine 260 of FIG. 2, generate the summary of the CS. A presentation component, such as but not limited to presentation component 220 of FIG. 2, may provide the summary to the user.

Figure 4:
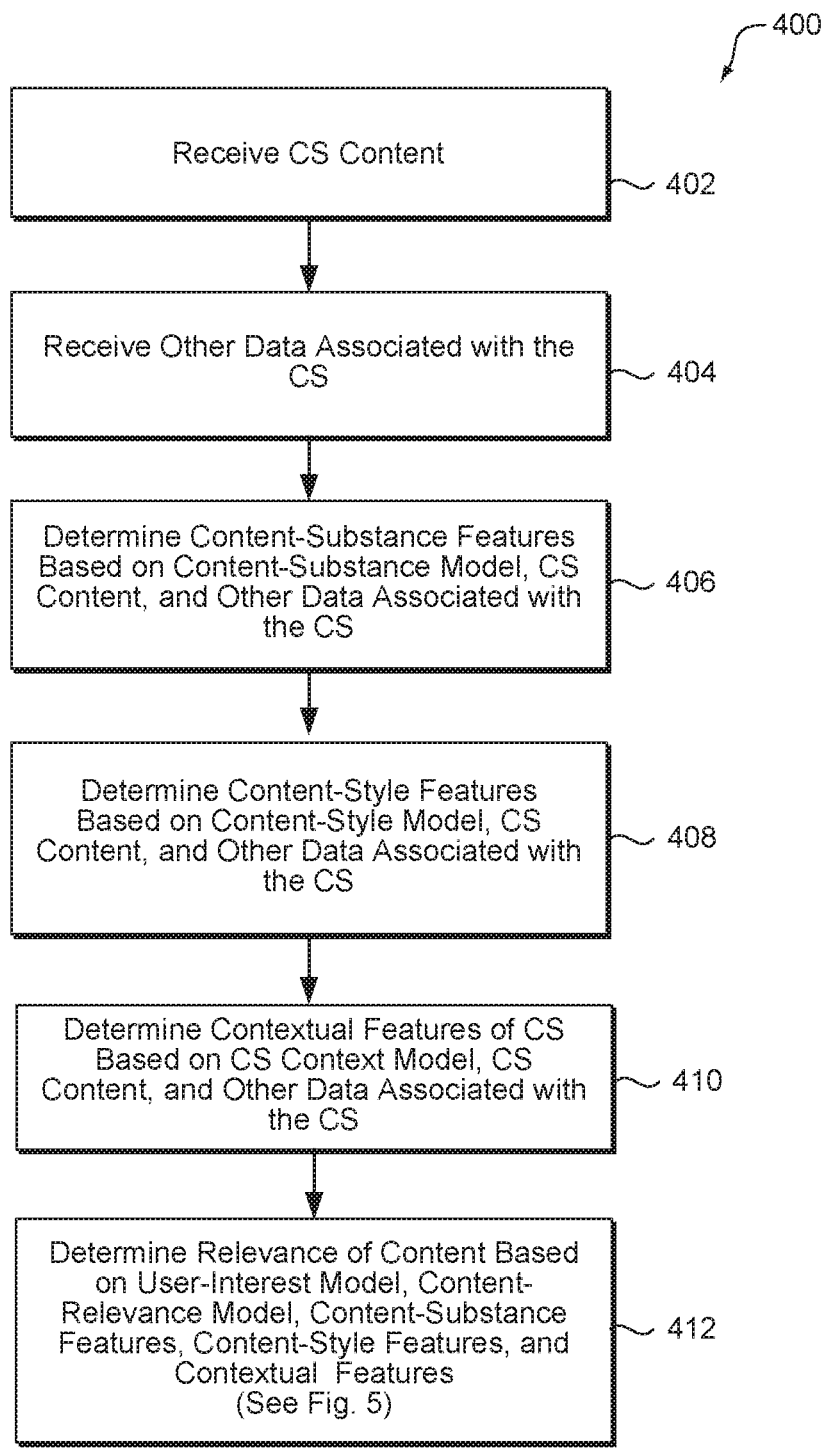
FIG. 4 depicts a flow diagram of a method determining a relevance of content of the communication session of FIG. 3, in accordance with an embodiment of the present disclosure.

FIG. 4 depicts a flow diagram of a method for determining a relevance of content of the communication session of FIG. 3, in accordance with an embodiment of the present disclosure. At step 402, the content of the CS is received. For instance, the content may be received by a CS monitor, such as but not limited to CS monitor and analyzer 290 of FIG. 2. At step 404, other data associated with the CS, such as but not limited to metadata of the CS, may be received. At least a portion of the other data may be associated with the context of the CS. The other data, including the metadata, may be received by the same or a separate CS monitor that received the content at step 402.

At step 406, one or more content-substance features of the received content are determined and/or identified. Determining the content-substance features may be based on the content, a content-substance model, and the other data associated with the CS. A content-substance model learner, such as but not limited to content-substance model learner 272 of FIG. 2, may generate, update, and/or train the content-substance model. Determining the content-substance features may include determining one or more content-substance features for at least a portion of the content lines (or blocks of content lines) of the content.

The content-substance features of a content line may encode or indicate the conceptual or semantic components of the content line. That is, the content-substance feature may indicate the semantics, meanings, and/or intensions associated with the content line. A content-substance feature may indicate one or more topics and/or keywords associated with the content line. A content-substance feature may also indicate a sentiment of the speaker. That is, a sentiment content-substance feature may encode an identified and/or categorized opinion expressed in the content. As CS-content analyzer, such as but not limited to CS-content analyzer 292 of FIG. 2, may determine and/or identify the one or more content-substance features. A content-substance feature may be an observable, latent, or hidden feature or variable of the substance of the content.

At step 408, one or more content-style features of the received content are determined and/or identified. Determining the content-style features may be based on the content, a content-style model, and the other data associated with the CS. A content-style model learner, such as but not limited to content-style model learner 274 of FIG. 2, may generate, update, and/or train the content-style model. Determining the content-style features may include determining one or more content-style features for at least a portion of the content lines (or blocks of content lines) of the content.

The content-style features of a content line may encode or represent the stylistic (e.g., grammatical) choices of the speaker of the content line. That is, content-style features may indicate grammar, vocabulary, and dialogue choices of the speaker. For instance, content-style features may encode the speaking style of the speaker. Content-style features may additionally encode one or more emotions of the speaker, e.g., anger, surprise, satisfaction, happiness, and other emotions. Content-style features may indicate the intonation, speed, and volume of the speaker. CS-content analyzer 292 may determine and/or identify the one or more content-substance features. A content-style feature may be an observable, latent, or hidden feature or variable of the style of the content.

At step 410, one or more contextual features of the CS are determined and/or identified. Determining the contextual features may be based on the content, a CS context model, and the other data associated with the CS, including at least the received metadata. A CS context model learner, such as but not limited to CS context model learner 278 of FIG. 2, may generate, update, and/or train the CS context model. A contextual feature may be an observable, latent, or hidden feature or variable of the context of the CS. A CS-context analyzer, such as but not limited to CS-context analyzer 294 of FIG. 2, may be employed to determine the one or more contextual features of the CS.

Contextual features of a CS may include, but are not otherwise limited to an indication or encoding of each of the users participating in and/or associated with the CS, an activity and/or engagement level of each of the associated users, and an availability of each of the associated users. Contextual features may additionally indicate initiating and terminating time stamps of the CS, the temporal duration of the CS, and an indication of other past or current CSs that the associated users have or are currently participating in. Additional contextual features may indicate an approximate geo-location and/or logical location of each associated user. A CS contextual feature may include or be based on any user profile information for each of the associated users.

A contextual feature for a CS may indicate or encode a hierarchical relational graph that indicates one or more relationships between at least some of the pairs of associated users of the CS. An indicated relationship may include a professional, personal, or genetic relationship. For instance, the relational graph may indicate a manager/subordinate relationship, a spousal/personal partnership relationship, a parent/child/sibling relationship, or any other such relationship for pairs of associated users. A contextual feature may indicate one or more social network graphs based on and/or generated from one or more social network platforms that the users employ. A contextual feature may include an indication, such as but not limited to a static or dynamic link, for materials referenced and/or exchanged in the conversation, such as emails, websites, slide decks, spreadsheets, files, or other such documents, including any multimedia content. Such multimedia content may include electronic books (e-books), audio and/or video files, animations, organization charts, or other such audible, visual, and/or textual content.

A contextual feature may encode one or more contextual tags. For instance, a "social" tag may be encoded in a contextual feature for a CS that is directed towards a social conversation or interaction, whereas "work" and/or "meeting" tags may be a CS contextual feature of a CS that is directed towards a work-related meeting. Contextual features may indicate or encode meeting titles, meeting subjects, meeting agendas, meeting schedules, or other such information indicating the structure and/or topics of a conversation of the CS. A contextual feature may indicate one or more privacy and/or encryption configurations of the CS. A contextual feature for a CS may encode virtually any determinable information that is indicative of a context of the CS.

A contextual feature may encode a "role" or "position" for at least a portion of the users within the CS. For instance, a contextual feature may encode whether a particular user is a "leader," "participant," or an "observer" within the CS. The context of the CS for each user may be based on their role or position within the CS. Thus, the identification of likely relevant content and the summarization of the likely-content, for a particular user, may be based on their role or position within the CS, as well as the role or position of each of the other users.

At step 412, a relevance of the content is determined based on at least one of the user-interest model, the content-relevance model, the one or more content-substance features, the one or more content-style features, and the one or more contextual features. A content relevance engine, such as but not limited to content relevance determiner 280 of FIG. 2, may be employed to determine the relevance of the content. In at least one embodiment, content relevance analyzer 282 of FIG. 2 is employed to determine the relevance of the content.

Figure 5:
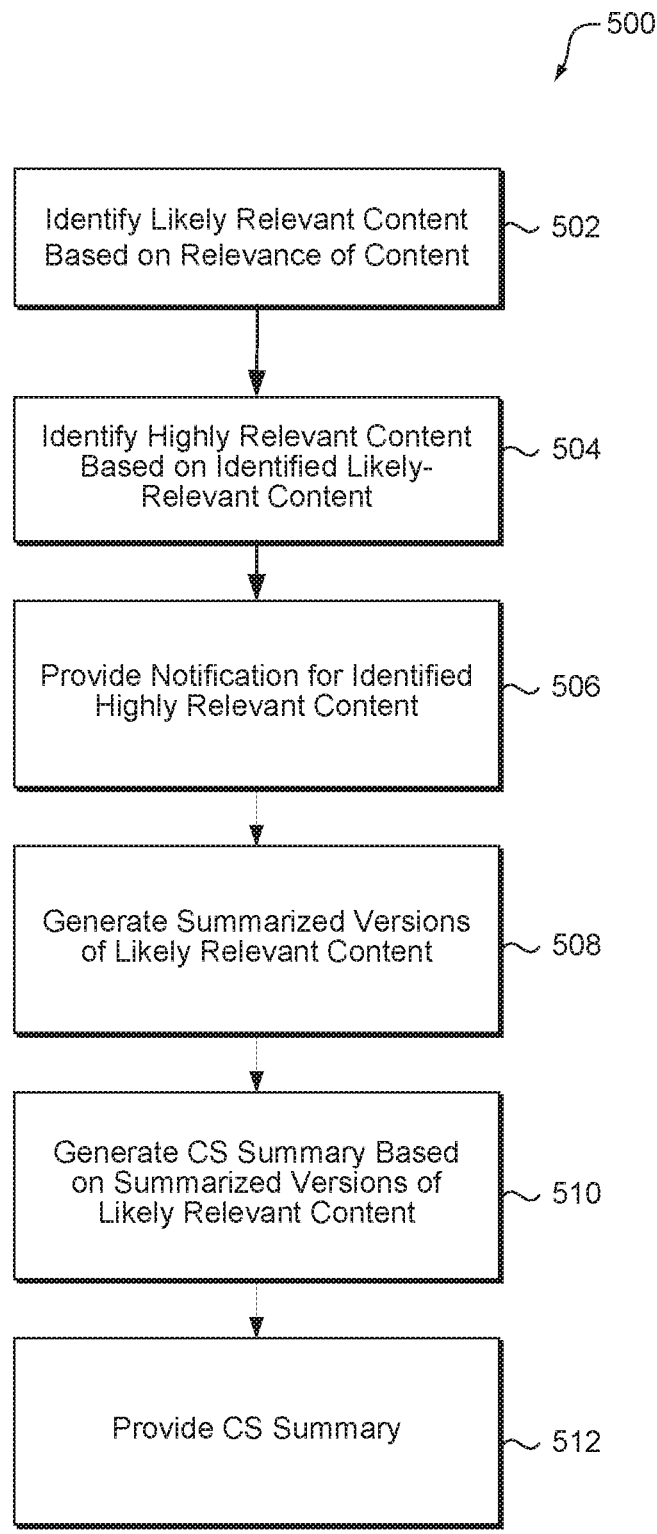
FIG. 5 depicts a flow diagram of a method for providing a summary of the communication session of FIG. 3, in accordance with an embodiment of the present disclosure.

Various embodiments for determining the relevance of the content are discussed in conjunction with at least process 500 of FIG. 5. However, briefly here, determining the relevance of the content includes determining one or more probabilities, wherein the one or more probabilities correlate with the likelihood that the content is relevant to the user. The one or more probabilities may be structured as a normalized scalar, vector, a matrix, a tensor, or some other data structure such as a multidimensional array. Each component of the data structure indicates a probability that the content is relevant to the user, with respect to one or more of the user's interests. At least one component of the determined content relevance may indicate a temporal urgency of the content. That is, the component indicates that the content is of an urgent nature to the user and the content should be brought to the user's attention very soon. In at least one embodiment, a relevance for content includes an overall relevance that is a combination of the one or more probabilities corresponding to the various topics of interest to the user.

FIG. 5 depicts a flow diagram of a method for providing a summary of the communication session of FIG. 3, in accordance with an embodiment of the present disclosure. At step 502, one or more portions of the content that is likely relevant to user are identified based on the relevance of the content. A content identifier, such as but not limited to content identifier 284 of FIG. 2, may be employed to identify the likely relevant content.

Identifying the likely relevant content may be based one or more relevance thresholds. That is, content may be identified as likely relevant if one or more of the relevant probabilities or scores is greater than a relevance threshold. In at least one embodiment, the content may be identified as likely relevant if the overall relevance is greater than an overall relevance threshold. In some embodiments, the content may be identified as likely relevant if the probability corresponding to the temporal urgency is greater than an urgency threshold. One or more relevance thresholds may be provided by the user via user preferences 248 and/or other information included in user profile 240 of FIG. 2.

In other embodiments, the likely relevant content may be identified based on other methods. In at least one embodiment, determining the likely relevant content may be based on ML methodologies. For instance, the user may manually curate an automatically generated CS summary and/or provide manually generated CS summaries. The curated and/or manually generated summaries may be stored in user curated CS summaries 258 of FIG. 2 and may serve as "ground-truth" summaries Various ML methodologies may learn data models to learn to identify the likely relevant content. In at least one embodiment, using manually curated CS summaries as "ground-truth" summaries enables the automatic determination of one or more relevance thresholds.

At step 504, highly relevant content may be identified based on the identified likely relevant content, the relevance of the content, and additional relevance threshold. The highly relevant content may be identified by a content identifier, such as but not limited to content identifier 284. The highly relevant content may be identified based on a relevant threshold that is greater than the relevant thresholds employed to identify the likely relevant content. That is, content may be identified as highly relevant if one or more of the relevant probabilities or scores is greater than a highly relevant threshold. For instance, an urgency threshold may be employed to identify the highly relevant content.

At step 506, a notification for the highly relevant content may be provided to the user. A content notifier, such as but not limited to content notifier 286 of FIG. 2, may be employed to provide the user a notification of the highly relevant content. In at least one embodiment, a presentation component, such as presentation component 220 of FIG. 2, may assist in providing the real-time notifications to the user. For content that is identified as highly relevant to the user, the various embodiments may provide, real-time and/or near real-time, audible and/or visual notifications or prompts to call the user's attention to the content. For instance, as discussed herein, the determined relevance may include a determined temporal urgency of the content. When a user is simultaneously participating in multiple CSs distributed across multiple windows or user interfaces, the various embodiments may highlight or position the user interface that includes identified highly urgent content in the foreground of the user's display device. The user's attention may further be directed to the highly urgent content with additional selective-highlighting within the user interface that is now in the display device's foreground. Thus, in addition to summarizing relevant CS content, the enhanced CS services provided by the various embodiments include identifying and highlighting CS content that is highly relevant to the user, where the identification of highly relevant content is targeted to the specific user. In at least one embodiment, the notification to highlight highly relevant content may be provided via automatically generated speech. The speech-based notification may include the highly relevant content, a summarized version of the highly relevant content, or simply a spoken, or otherwise audible, indication to direct the user's attention to a specific user interface.

At step 508, summarized versions of the identified likely relevant content may be generated. Generating the summarized version of the likely relevant content may be based on one or more natural language models. That is, natural language models may be employed to generate condensed or more compact versions of the likely relevant content. The summarized versions of the likely relevant content may be based on content-substance and content-style preferences of the user. The substance of the summarized versions of the likely relevant content may be generated by a summary-substance generator, such as but not limited to summary-substance generator 262 of FIG. 2. The style of the summarized versions of the likely relevant content may be generated by a summary formatter, such as but not limited to summary formatter 264 of FIG. 2.

At step 510, the summary of the CS is automatically generated based on the summarized versions of the likely relevant content. At step 512, the generated summary is provided to the user. A summary presentation analyzer, such as summary presentation analyzer 266 of FIG. 2, may be employed to generate the summary of the CS. A presentation component, such as presentation component 220 of FIG. 2, may provide the summary to the user. The automatically generated summary of the CS may be provided to the user in a textual format and/or via audible speech that is automatically generated via text-to-voice services enabled by the various embodiments.

More specifically, at block 512, one or more summaries of one or more CSs may be provided to one or more users, at appropriate times, such as but not limited to when the user's input or guidance is needed with a conversation, or when the user has resumed active participation in a conversation of a particular CS. For instance, when a user's attention is returned to a particular CS, either through selecting and/or clicking on a window hosting the CS, the summary of the CS, up until that point, or from when the user's attention was previously diverted from the particular CS, may be provided to the user. In another embodiment, the CS summary may be provided when it is determined that the user is available and/or receptive to such a summary.

In some embodiments, a cloud system and/or a cloud service may be utilized to perform at least portions of methods 300, 400, and 500 so as to provide an improved or enhanced user experience (such as personalized summaries of one or more CSs) to multiple services, which may be running on many different user devices.

Figure 6:
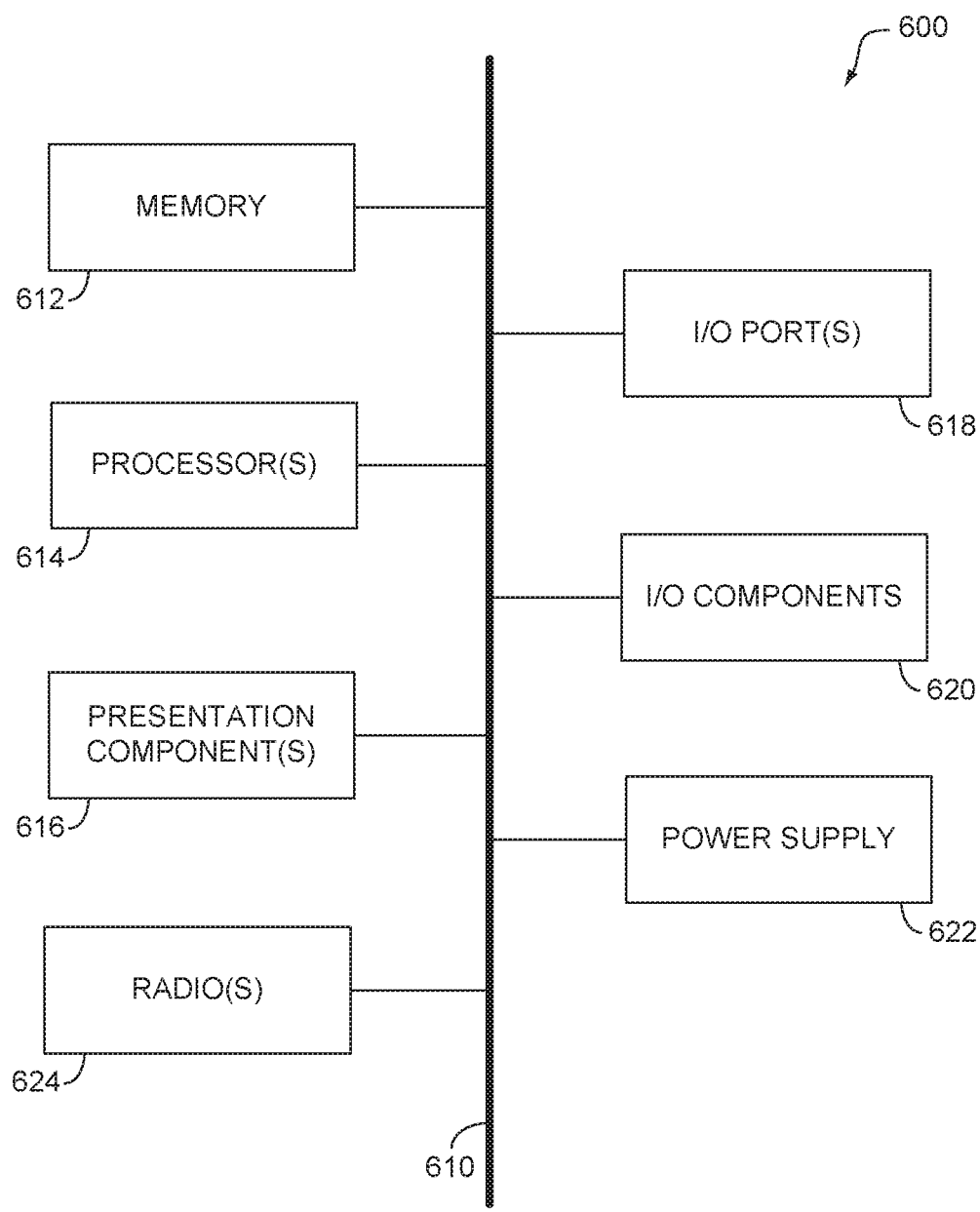
FIG. 6 is a block diagram of an exemplary computing environment suitable for use in implementing an embodiment of the present disclosure.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-usable instructions, including computer-usable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. In some implementations, presentation component 220 of system 200 may be embodied as a presentation component 616. Other examples of presentation components may include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system comprising:
   one or more processors; and
   computer storage memory having computer-executable instructions stored thereon which, when executed by the one or more processors, implement a method comprising:
   receiving content that is exchanged within a communication session (CS), wherein the content includes one or more natural language expressions that encode a portion of a conversation carried out by a plurality of users participating in the CS;
   determining one or more content features based on the content and one or more natural language models;
   determining a relevance of the content based on the content features using one or more models indicating user interests or content-relevance for a first user of the plurality of users, the one or more models comprising a content-relevance model;
   determining, using the one or more models, the relevance comprises a temporal urgency that indicates that the content is of an urgent nature to the first user and should be displayed differently relative to other content;
   based on the temporal urgency and a highly relevant temporal urgency associated with a temporal urgency threshold for identifying highly relevant portions of content, identifying a highly relevant portion of the content, wherein the highly relevant portion of the content is a sub-portion of the content that is highly relevant to the first user;
   providing a real-time notification of the identified highly relevant portion of the content to the first user by highlighting or positioning the highly relevant portion of the content in a foreground of a user interface of a display device of the first user;
   generating a first summary of the CS comprising a summarized version of the content;
   communicating the first summary of the CS to a first user;
   receiving a second summary of the CS from the first user;
   generating a comparison of the first summary and the second summary;
   updating the content-relevance model based on the comparison of the first summary and the second summary; and
   providing the updated content-relevance model to support identifying relevant content in communication sessions.

2. The system of claim 1, wherein the method further comprises:
   monitoring user activity of the first user;
   identifying one or more user-activity patterns based on the monitored user activity; and
   generating the one or more models based on the one or more user-activity patterns.

3. The system of claim 1, wherein the method further comprises:
   receiving metadata associated with the CS;
   determining one or more contextual features of the CS based on the received metadata and a CS context model, wherein the one or more contextual features indicate a context of the conversation for the first user; and
   determining the relevance of the content further based on the one or more contextual features of the CS.

4. The system of claim 1, wherein the method further comprises:
   generating a summary of the CS based on the relevance of the content and a corresponding temporal urgency determined using the one or more models.

5. The system of claim 1, wherein the method further comprises:
   determining one or more content-substance features based on the content and a content-substance model included in the one or more natural language models, wherein the one or more content-substance features indicate one or more topics discussed in the conversation;
   determining one or more content-style features based on the content and a content-style model included in the one or more natural language models, wherein the one or more content-style features indicate an emotion of at least one of the plurality of the users; and
   determining the relevance of the content further based on the one or more content-substance features and the one or more content-style features.

6. A method comprising:
   receiving content that is exchanged within a communication session (CS), wherein the content includes one or more natural language expressions that encode a conversation carried out by a plurality of users participating in the CS;
   determining one or more content features based on the content and one or more natural language models;
   determining a relevance of the content based on the content features using one or more models indicating user interests or content-relevance for a first user of the plurality of users, the one or more models comprising a content-relevance model;

determining, using the one or more models, the relevance comprises a temporal urgency that indicates that the content is of an urgent nature to the first user and should be displayed differently relative to other content;

based on the temporal urgency and a highly relevant temporal urgency associated with a temporal urgency threshold for identifying highly relevant portions of content, identifying a highly relevant portion of the content, wherein the highly relevant portion of the content is a sub-portion of the content that is highly relevant to the first user;

providing a real-time notification of the identified highly relevant portion of the content to the first user by highlighting or positioning the highly relevant portion of the content in a foreground of a user interface of a display device of the first user;

generating a first summary of the CS comprising a summarized version of the content;

communicating the first summary of the CS to a first user;

receiving a second summary of the CS from the first user;

generating a comparison of the first summary and the second summary;

updating the content-relevance model based on the comparison of the first summary and the second summary; and providing the updated content-relevance model to support identifying relevant content in communication sessions.

7. The method of claim 6, further comprising:
monitoring user activity of the first user;
identifying one or more user-activity patterns based on the monitored user activity; and
generating the one or more models based on the one or more user-activity patterns.

8. The method of claim 6, further comprising:
receiving another content;
determining one or more content features of the another content based on the one or more natural language models;
querying a knowledge graph based on the one or more content features of the another content; and
generating the one or more models based on a result of the query of the knowledge graph.

9. The method of claim 6, further comprising:
generating a summary of the CS based on the relevance of the content and a corresponding temporal urgency determined using the one or more models.

10. The method of claim 6, further comprising:
determining one or more content-substance features based on the content and a content-substance model included in the one or more natural language models, wherein the one or more content-substance features indicate one or more topics discussed in the conversation;
determining one or more content-style features based on the content and a content-style model included in the one or more natural language models, wherein the one or more content-style features indicate an emotion of at least one of the plurality of the users; and
determining the relevance of the content further based on the one or more content-substance features and the one or more content-style features.

11. The method of claim 6, further comprising:
determining, using the one or more models, the relevance comprises a temporal urgency that indicates that the content is of an urgent nature to the first user and should be displayed differently relative to other content.

12. One or more hardware computer storage media and having instructions stored thereon, wherein the instructions, when executed by one or more hardware processors of a computing device, cause the one or more hardware processors of the computing device to perform actions including:

receiving content that is exchanged within a communication session (CS), wherein the content includes one or more natural language expressions that encode a conversation carried out by a plurality of users participating in the CS;

determining one or more content features based on the content and one or more natural language models;

determining a relevance of the content based on the content features using one or more models indicating user interests or content-relevance for a first user of the plurality of users, the one or more models comprising a content-relevance model;

determining, using the one or more models, the relevance comprises a temporal urgency that indicates that the content is of an urgent nature to the first user and should be displayed differently relative to other content;

based on the temporal urgency and a highly relevant temporal urgency associated with a temporal urgency threshold for identifying highly relevant portions of content, identifying a highly relevant portion of the content, wherein the highly relevant portion of the content is a sub-portion of the content that is highly relevant to the first user;

providing a real-time notification of the identified highly relevant portion of the content to the first user by highlighting or positioning the highly relevant portion of the content in a foreground of a user interface of a display device of the first user;

generating a first summary of the CS comprising a summarized version of the content;

communicating the first summary of the CS to a first user;

receiving a second summary of the CS from the first user;

generating a comparison of the first summary and the second summary;

updating the content-relevance model based on the comparison of the first summary and the second summary; and providing the updated content-relevance model to support identifying relevant content in communication sessions.

13. The media of claim 12, the actions further comprising:
monitoring user activity of the first user;
identifying one or more user-activity patterns based on the monitored user activity; and
generating the one or more models based on the one or more user-activity patterns.

14. The media of claim 12, wherein the actions further comprise:
receiving metadata associated with the CS;
determining one or more contextual features of the CS based on the received metadata and a CS context model, wherein the one or more contextual features indicate a context of the conversation for the first user; and
determining the relevance of the content further based on the one or more contextual features of the CS.

15. The media of claim 12, wherein the actions further comprise:
generating a summary of the CS based on the relevance of the content and a corresponding temporal urgency determined using the one or more models.

16. The media of claim 12, wherein the actions further comprise:
- determining one or more content-substance features based on the content and a content-substance model included in the one or more natural language models, wherein the one or more content-substance features indicate one or more topics discussed in the conversation;
- determining one or more content-style features based on the content and a content-style model included in the one or more natural language models, wherein the one or more content-style features indicate an emotion of at least one of the plurality of the users; and
- determining the relevance of the content further based on the one or more content-substance features and the one or more content-style features.

17. The media of claim 12, wherein the actions further comprise:
- receiving another content;
- determining one or more content features of the another content based on the one or more natural language models;
- querying a concept map based on the one or more content features of the other features; and
- generating the one or more models based on a result of the query of the concept map.

* * * * *